(12) United States Patent
Watarai et al.

(10) Patent No.: US 9,764,794 B2
(45) Date of Patent: Sep. 19, 2017

(54) BICYCLE BRAKE DEVICE AND BICYCLE RIM BRAKE DEVICE

(71) Applicant: SHIMANO INC., Sakai (JP)

(72) Inventors: Etsuyoshi Watarai, Sakai (JP); Osamu Kariyama, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 131 days.

(21) Appl. No.: 14/633,948

(22) Filed: Feb. 27, 2015

(65) Prior Publication Data

US 2016/0251055 A1   Sep. 1, 2016

(51) Int. Cl.
   *B62L 1/00*   (2006.01)
   *B62L 3/02*   (2006.01)
   *B62L 1/14*   (2006.01)

(52) U.S. Cl.
   CPC ............... *B62L 3/023* (2013.01); *B62L 1/14* (2013.01)

(58) Field of Classification Search
   CPC .. B62L 3/023; B62L 1/16; B62L 1/005; B62L 1/14
   USPC ............ 188/24.11, 24.12, 24.13, 26, 344
   See application file for complete search history.

(56) References Cited

U.S. PATENT DOCUMENTS

| 532,298 A | 1/1895 | Wallace | |
|---|---|---|---|
| 3,338,337 A * | 8/1967 | Freeland | B62L 3/023 188/344 |
| 3,554,334 A * | 1/1971 | Shimano | B62L 3/023 188/24.16 |
| 3,776,333 A * | 12/1973 | Mathauser | B62L 3/023 188/24.19 |
| 3,899,057 A * | 8/1975 | Carre | B60T 11/16 188/196 C |
| 3,921,764 A * | 11/1975 | Mathauser | B62L 1/16 188/24.14 |
| 3,993,174 A * | 11/1976 | Williams | B62L 1/14 188/344 |
| 4,036,333 A * | 7/1977 | Mathauser | B62L 1/005 188/24.11 |

(Continued)

FOREIGN PATENT DOCUMENTS

| CH | 618931 | 8/1980 |
|---|---|---|
| DE | 10 2011 003 274 | 8/2012 |

(Continued)

OTHER PUBLICATIONS

Office Action with Form PTO-892 Notice of References Cited issued by the United States Patent and Trademark Office for the co-pending U.S. Appl. No. 14/633,910, dated May 23, 2016.

(Continued)

*Primary Examiner* — Anna Momper
*Assistant Examiner* — Mahbubur Rashid
(74) *Attorney, Agent, or Firm* — Mori & Ward, LLP

(57) ABSTRACT

A bicycle brake device comprises a friction member, a base member, a link structure, and a piston. The base member includes a hydraulic cylinder. The link structure is configured to couple the friction member to the base member so as to move the friction member relative to the base member between a rest position and a braking position. The piston is movable in the hydraulic cylinder in a movement direction and configured to push the link structure to move the friction member from the rest position toward the braking position.

20 Claims, 21 Drawing Sheets

(56) References Cited

U.S. PATENT DOCUMENTS

| | | | | |
|---|---|---|---|---|
| 4,585,094 | A | * | 4/1986 | Rottenkolber ............ B62L 1/10 188/24.22 |
| 4,632,225 | A | * | 12/1986 | Mathauser .............. B62L 3/023 188/24.18 |
| 4,765,443 | A | * | 8/1988 | Cunningham ............ B62L 3/00 188/24.12 |
| 4,869,351 | A | * | 9/1989 | Romano .................. B62L 1/16 188/2 D |
| 4,938,318 | A | * | 7/1990 | Ishibashi .................. B62L 1/16 188/196 M |
| 5,368,136 | A | | 11/1994 | Walte |
| 5,425,434 | A | * | 6/1995 | Romano .................. B62L 1/16 188/24.15 |
| 5,431,257 | A | * | 7/1995 | Rocca ...................... B60T 1/12 188/24.19 |
| 5,443,134 | A | * | 8/1995 | Gajek ...................... B62L 1/14 188/2 D |
| 5,503,252 | A | * | 4/1996 | Gelbein ................... B62L 1/14 188/24.19 |
| 5,678,665 | A | | 10/1997 | Debreczeni |
| 5,803,207 | A | | 9/1998 | Nielsen |
| 5,913,387 | A | * | 6/1999 | Yamashita ................ B62L 1/14 188/24.21 |
| 5,960,913 | A | * | 10/1999 | Kuo ......................... B62L 1/14 188/24.12 |
| 6,119,818 | A | | 9/2000 | Krumbeck et al. |
| 6,125,973 | A | * | 10/2000 | Irvine .................. F16D 65/092 188/24.22 |
| 6,220,399 | B1 | * | 4/2001 | Phillips ..................... B62L 1/10 188/24.21 |
| 7,318,502 | B2 | * | 1/2008 | Costa ...................... B62L 1/005 188/24.22 |
| 7,464,798 | B2 | * | 12/2008 | Sandro ..................... B62L 1/10 188/24.11 |
| 8,069,391 | B1 | | 11/2011 | Wu et al. |
| 8,651,244 | B2 | | 2/2014 | Moore |
| 8,678,144 | B2 | | 3/2014 | Tetsuka et al. |
| 9,586,646 | B2 | * | 3/2017 | Nakakura ................. B62L 1/14 |
| 2005/0061587 | A1 | * | 3/2005 | Tsai .......................... B62L 1/16 188/24.14 |
| 2007/0068744 | A1 | | 3/2007 | Tsai |
| 2007/0251780 | A1 | | 11/2007 | Lyons |
| 2010/0230215 | A1 | * | 9/2010 | Ginster ................. B60T 11/046 188/24.22 |
| 2011/0011684 | A1 | * | 1/2011 | Tetsuka ..................... B60T 1/06 188/24.22 |
| 2011/0290595 | A1 | * | 12/2011 | Nago ........................ B60T 1/06 188/24.22 |
| 2012/0222921 | A1 | * | 9/2012 | Nago ........................ B62L 1/16 188/24.21 |
| 2013/0009380 | A1 | | 1/2013 | Servet |
| 2013/0112510 | A1 | * | 5/2013 | Jordan ...................... B62L 1/12 188/24.22 |
| 2013/0341128 | A1 | * | 12/2013 | Jordan .................... B62L 3/023 188/24.22 |
| 2014/0265221 | A1 | | 9/2014 | D'Aluisio et al. |
| 2014/0265222 | A1 | | 9/2014 | D'Aluisio |
| 2016/0031522 | A1 | | 2/2016 | Nago |
| 2016/0251054 | A1 | | 9/2016 | Watarai et al. |

FOREIGN PATENT DOCUMENTS

| | | |
|---|---|---|
| DE | 10 2014 204 781 | 9/2014 |
| EP | 2316719 | 5/2011 |
| EP | 2495160 | 9/2012 |
| EP | 2543583 | 1/2013 |
| GB | 2493063 | 1/2013 |
| WO | WO 2007/031967 | 3/2007 |
| WO | WO 2008/009817 | 1/2008 |

OTHER PUBLICATIONS

Office Action with Form PTO-892 Notice of References Cited issued by the United States Patent and Trademark Office for the co-pending U.S. Appl. No. 14/633,910, dated Sep. 28, 2016.

* cited by examiner

BICYCLE BRAKE DEVICE AND BICYCLE RIM BRAKE DEVICE

BACKGROUND OF THE INVENTION

Field of the Invention

The present invention relates to a bicycle brake device and a bicycle rim brake device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle brake device.

SUMMARY OF THE INVENTION

In accordance with a first aspect of the present invention, a bicycle brake device comprises a friction member, a base member, a link structure, and a piston. The base member includes a hydraulic cylinder. The link structure is configured to couple the friction member to the base member so as to move the friction member relative to the base member between a rest position and a braking position. The piston is movable in the hydraulic cylinder in a movement direction and configured to push the link structure to move the friction member from the rest position toward the braking position.

In accordance with a second aspect of the present invention, the bicycle brake device according to the first aspect is configured so that the link structure includes a first link member pivotably coupled to the base member about a first pivot axis. The piston is configured to push the first link member to move the friction member from the rest position toward the braking position.

In accordance with a third aspect of the present invention, the bicycle brake device according to the second aspect is configured so that the piston is at least partially provided in a link area defined by an outline of the first link member when viewed from the movement direction.

In accordance with a fourth aspect of the present invention, the bicycle brake device according to the third aspect is configured so that the piston has a center axis parallel to the movement direction. The center axis is provided in the link area when viewed from the movement direction.

In accordance with a fifth aspect of the present invention, the bicycle brake device according to the second aspect is configured so that the first link member includes a receiving portion contactable with the piston. The piston is configured to push the receiving portion of the first link member.

In accordance with a sixth aspect of the present invention, the bicycle brake device according to the fifth aspect is configured so that the first link member includes a first frame portion pivotably coupled to the base member about the first pivot axis. The receiving portion is secured to the first frame portion.

In accordance with a seventh aspect of the present invention, the bicycle brake device according to the sixth aspect is configured so that the first link member includes a second frame portion pivotably coupled to the base member about the first pivot axis. The receiving portion is secured to the second frame portion.

In accordance with an eighth aspect of the present invention, the bicycle brake device according to the seventh aspect is configured so that the first frame portion is spaced apart from the second frame portion in an axial direction parallel to the first pivot axis. The receiving portion is provided between the first frame portion and the second frame portion in the axial direction and couples the first frame portion to the second frame portion.

In accordance with a ninth aspect of the present invention, the bicycle brake device according to the second aspect further comprises a first biasing member configured to bias the first link member relative to the base member toward the piston.

In accordance with a tenth aspect of the present invention, the bicycle brake device according to the second aspect is configured so that the link structure includes a second link member pivotably coupled to the first link member about a second pivot axis parallel to the first pivot axis. The friction member is attached to the second link member.

In accordance with an eleventh aspect of the present invention, the bicycle brake device according to the tenth aspect is configured so that the friction member is attached to the second link member so that an orientation of the friction member is adjustable relative to the second link member.

In accordance with a twelfth aspect of the present invention, the bicycle brake device according to the tenth aspect is configured so that the base member is configured to guide the second link member to maintain an orientation of a friction surface of the friction member between the rest position and the braking position.

In accordance with a thirteenth aspect of the present invention, the bicycle brake device according to the tenth aspect is configured so that the friction member has a friction surface which faces a rotatable member. The base member includes a guide surface. The link structure includes a guide member mounted on the second link member. The guide member is in contact with the guide surface to maintain an orientation of the friction surface of the friction member between the rest position and the braking position.

In accordance with a fourteenth aspect of the present invention, the bicycle brake device according to the thirteenth aspect is configured so that the guide member is rotatably mounted on the second link member.

In accordance with a fifteenth aspect of the present invention, the bicycle brake device according to the tenth aspect further comprises a second biasing member configured to bias the second link member relative to the first link member toward the base member.

In accordance with a sixteenth aspect of the present invention, the bicycle brake device according to the second aspect is configured so that the piston is coupled to the first link member without being fixed to the first link member.

In accordance with a seventeenth aspect of the present invention, the bicycle brake device according to the first aspect is configured so that the link structure is configured to pivotably couple the friction member to the base member about a first pivot axis. The piston is provided between the first pivot axis and the friction member.

In accordance with an eighteenth aspect of the present invention, the bicycle brake device according to the first aspect is configured so that the link structure includes a first link member pivotably coupled to the base member about a first pivot axis, and a second link member pivotably coupled to the first link member about a second pivot axis. The friction member is attached to the second link member. The piston is provided between the first pivot axis and the second pivot axis.

In accordance with a nineteenth aspect of the present invention, the bicycle brake device according to the first aspect further comprises an additional friction member, an additional base member, an additional link structure, an additional piston, and a coupling member. The additional base member includes an additional hydraulic cylinder. The additional link structure is configured to couple the additional friction member to the additional base member so as to move the additional friction member relative to the additional base member between an additional rest position and an additional braking position. The additional piston is movable in the additional hydraulic cylinder in an additional movement direction and configured to push the additional link structure to move the additional friction member from the additional rest position toward the additional braking position. The coupling member is configured to couple the base member to the additional base member.

In accordance with a twentieth aspect of the present invention, the bicycle brake device according to the nineteenth aspect is configured so that the hydraulic cylinder includes a fluid passageway connected to a hydraulic chamber defined by the hydraulic cylinder and the piston. The additional hydraulic cylinder includes an additional fluid passageway connected to an additional hydraulic chamber defined by the additional hydraulic cylinder and the additional piston. The coupling member includes an intermediate fluid passageway configured to connect the fluid passageway to the additional fluid passageway.

In accordance with a twenty-first aspect of the present invention, the bicycle brake device according to the twentieth aspect is configured so that the coupling member has a mounting structure configured to mount the coupling member to a bicycle frame.

In accordance with a twenty-second aspect of the present invention, the bicycle brake device according to the twenty-first aspect is configured so that the mounting structure has a mounting opening extending along a mounting axis. The intermediate fluid passageway at least partially extends in a mounting direction parallel to the mounting axis.

In accordance with a twenty-third aspect of the present invention, a bicycle rim brake device comprises a friction member, an additional friction member, a base structure, a piston, and an additional piston. The base structure includes a hydraulic cylinder, an additional hydraulic cylinder, and an internal fluid passageway. The internal fluid passageway includes a single inlet port, an outlet port connected to the hydraulic cylinder, and an additional outlet port connected to the additional hydraulic cylinder. The piston is movable in the hydraulic cylinder in a movement direction and configured to be operatively coupled to the friction member. The additional piston is movable in the additional hydraulic cylinder in an additional movement direction and configured to be operatively coupled to the additional friction member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
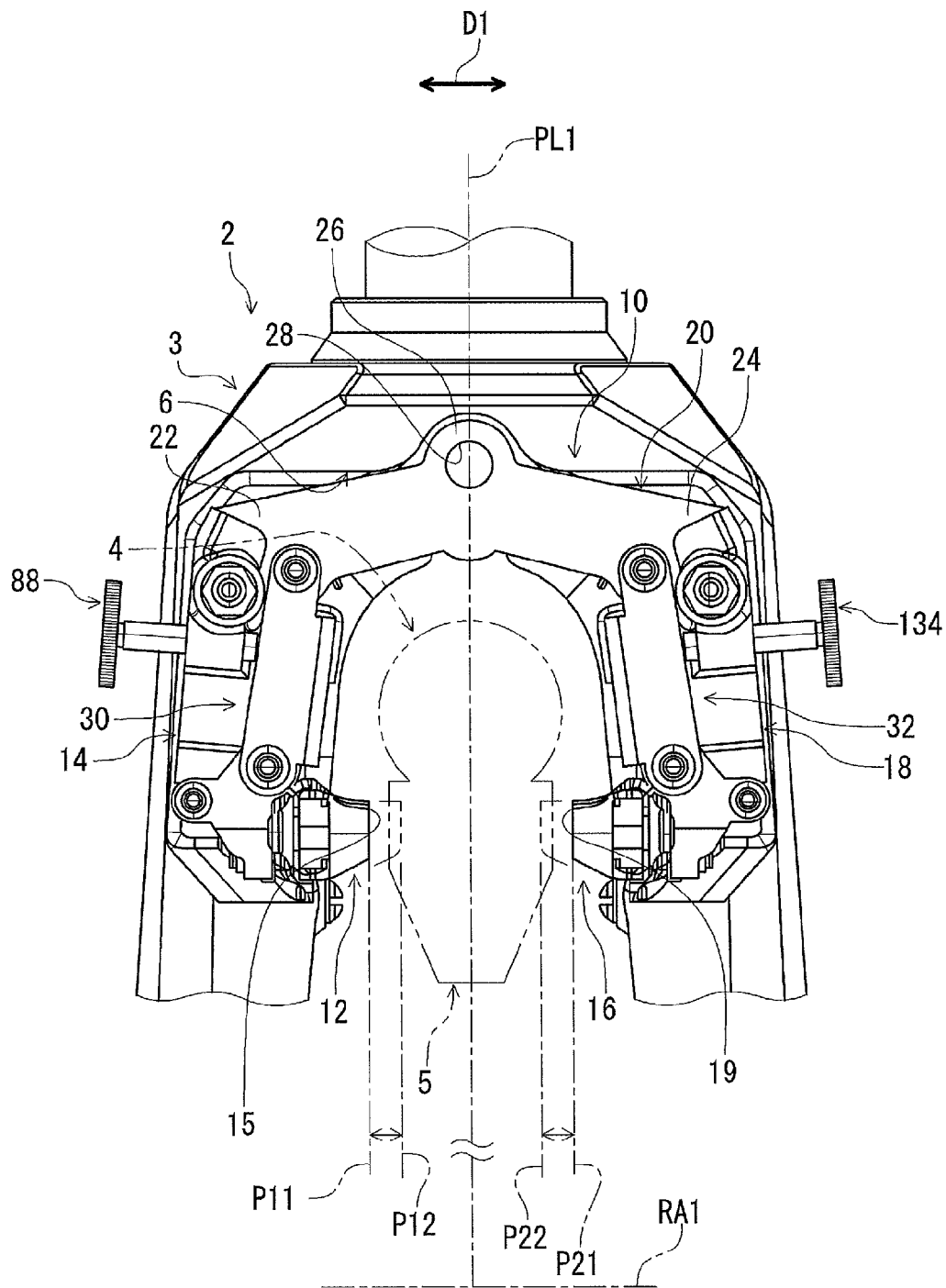
FIG. 1 is a rear elevational view of a bicycle frame provided with a bicycle brake device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle brake device 10 in accordance with a first embodiment is configured to be mounted to a bicycle frame 2. While the bicycle brake device 10 is a front brake device in the illustrated embodiment, structures of the bicycle brake device 10 can be applied to a rear brake device if needed and/or desired.

The bicycle brake device 10 is mounted to a front fork 3 of the bicycle frame 2 and is configured to apply a braking force to a rotatable member 4 such as a bicycle wheel rotatably attached to the front fork 3. The rotatable member 4 can also be referred to as the bicycle wheel 4. The bicycle brake device 10 is configured as a bicycle rim brake device in the illustrated embodiment. The structures of the bicycle brake device 10 can be applied to a bicycle dick brake device if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle brake device 10, should be interpreted relative to the bicycle equipped with the bicycle brake device 10 as used in an upright riding position on a horizontal surface.

As seen in FIG. 1, the bicycle brake device 10 comprises a friction member 12 and a base member 14. The friction member 12 is movable relative to the base member 14 and is slidable with a bicycle rim 5 of the bicycle wheel 4. The friction member 12 has a friction surface 15 which faces the rotatable member 4. The base member 14 is configured to be attached to the bicycle frame 2.

Figure 2:
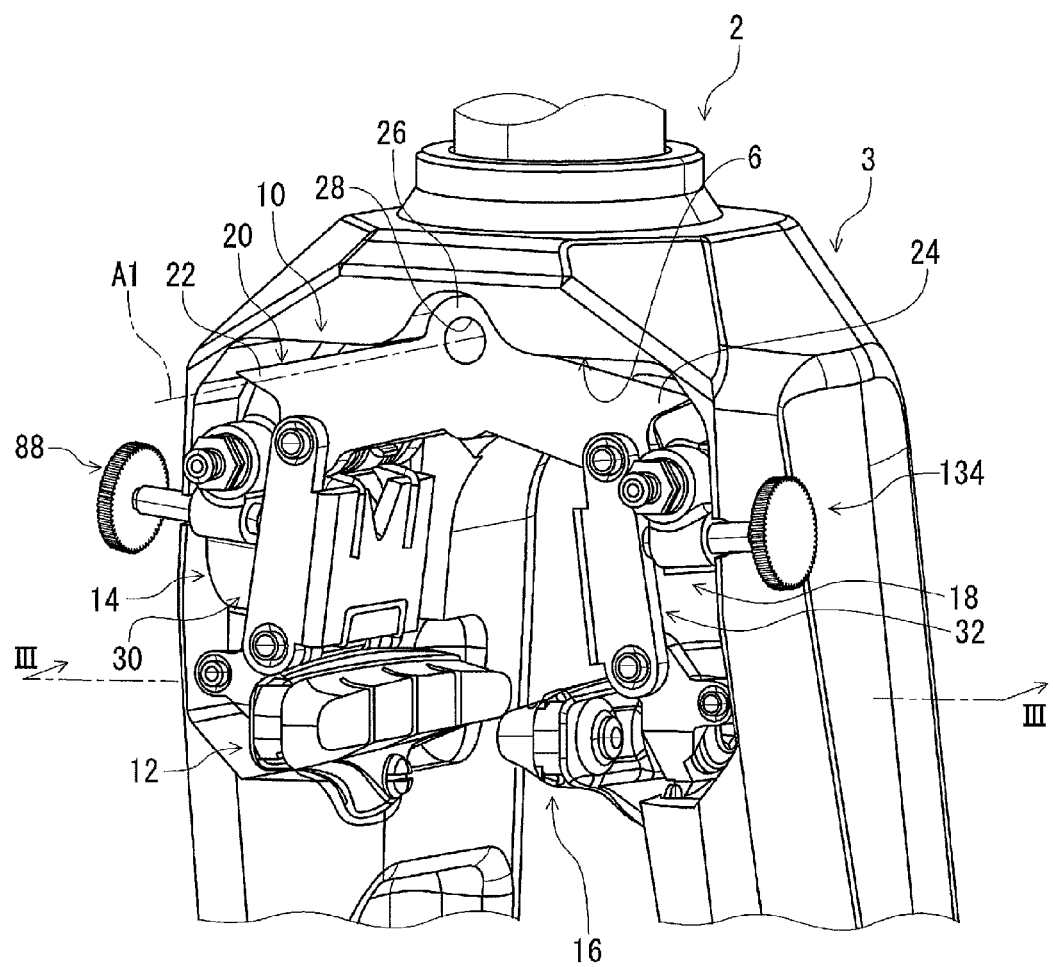
FIG. 2 is a perspective view of the bicycle brake device illustrated in FIG. 1.

As seen in FIG. 2, the bicycle brake device 10 is at least partially provided in an arrangement recess 6 of the bicycle frame 2 in an attachment state where the base member 14 is attached to the bicycle frame 2. When the friction member 12 is disposed at a rest position P11 (FIG. 1), the bicycle brake device 10 is at least partially provided in the arrangement recess 6 in the attachment state. In the illustrated embodiment, the bicycle brake device 10 is partially provided in the arrangement recess 6 of the bicycle frame 2 in the attachment state.

As seen in FIG. 1, the bicycle brake device 10 further comprises an additional friction member 16 and an additional base member 18. The additional friction member 16 can also be referred to as the friction member 16. The additional base member 18 can also be referred to as the base member 18. The additional friction member 16 is movable relative to the additional base member 18 and is slidable with the bicycle rim 5 of the bicycle wheel 4. The additional friction member 16 is spaced apart from the friction member 12 in a transverse direction D1 parallel to a rotational axis RA1 of the bicycle wheel 4. The additional friction member 16 has an additional friction surface 19 which faces the rotatable member 4. The additional base member 18 is configured to be attached to the bicycle frame 2. The friction member 12 and the additional friction member 16 are symmetrical with respect to a center virtual plane PL1 perpendicular to the rotational axis RA1. The bicycle brake device 10 has a symmetrical structure about the center virtual plane PL1.

The bicycle brake device 10 further comprises a coupling member 20 configured to couple the base member 14 to the additional base member 18. The additional base member 18 is spaced apart from the base member 14 in the transverse direction D1. In the illustrated embodiment, the coupling member 20 is configured to be attached to the bicycle frame 2. The coupling member 20 includes a first coupling end 22 and a second coupling end 24 opposite to the first coupling end 22. The base member 14 is secured to the first coupling end 22 of the coupling member 20. The additional base member 18 is secured to the second coupling end 24 of the coupling member 20. Namely, the base member 14 is attached to the bicycle frame 2 via the coupling member 20. The additional base member 18 is attached to the bicycle frame 2 via the coupling member 20.

As seen in FIG. 2, the coupling member 20 has a mounting structure 26 configured to mount the coupling member 20 to the bicycle frame 2. The mounting structure 26 has a mounting opening 28 extending along a mounting axis A1. In the illustrated embodiment, the mounting opening 28 is provided between the first coupling end 22 and the second coupling end 24 in the transverse direction D1. A mounting bolt (not shown) extends through the mounting opening 28. The coupling member 20 is attached to the bicycle frame 2 via the mounting structure 26 and the mounting bolt.

As seen in FIG. 1, the bicycle brake device 10 comprises a link structure 30. The link structure 30 is configured to couple the friction member 12 to the base member 14 so as to move the friction member 12 relative to the base member 14 between the rest position P11 and a braking position P12. The bicycle brake device 10 is configured to be operated via a brake operating device (not shown). The friction member 12 is disposed at the rest position P11 when the bicycle brake device 10 is not operated via the brake operating device.

The bicycle brake device 10 further comprises an additional link structure 32. The additional link structure 32 is configured to couple the additional friction member 16 to the additional base member 18 so as to move the additional friction member 16 relative to the additional base member 18 between an additional rest position P21 and an additional braking position P22. The additional link structure 32 can also be referred to as the link structure 32. The additional rest position P21 can also be referred to as the rest position P21. The additional braking position P22 can also be referred to as the braking position P22. The friction member 16 is disposed at the rest position P21 when the bicycle brake device 10 is not operated via the brake operating device.

Figure 3:
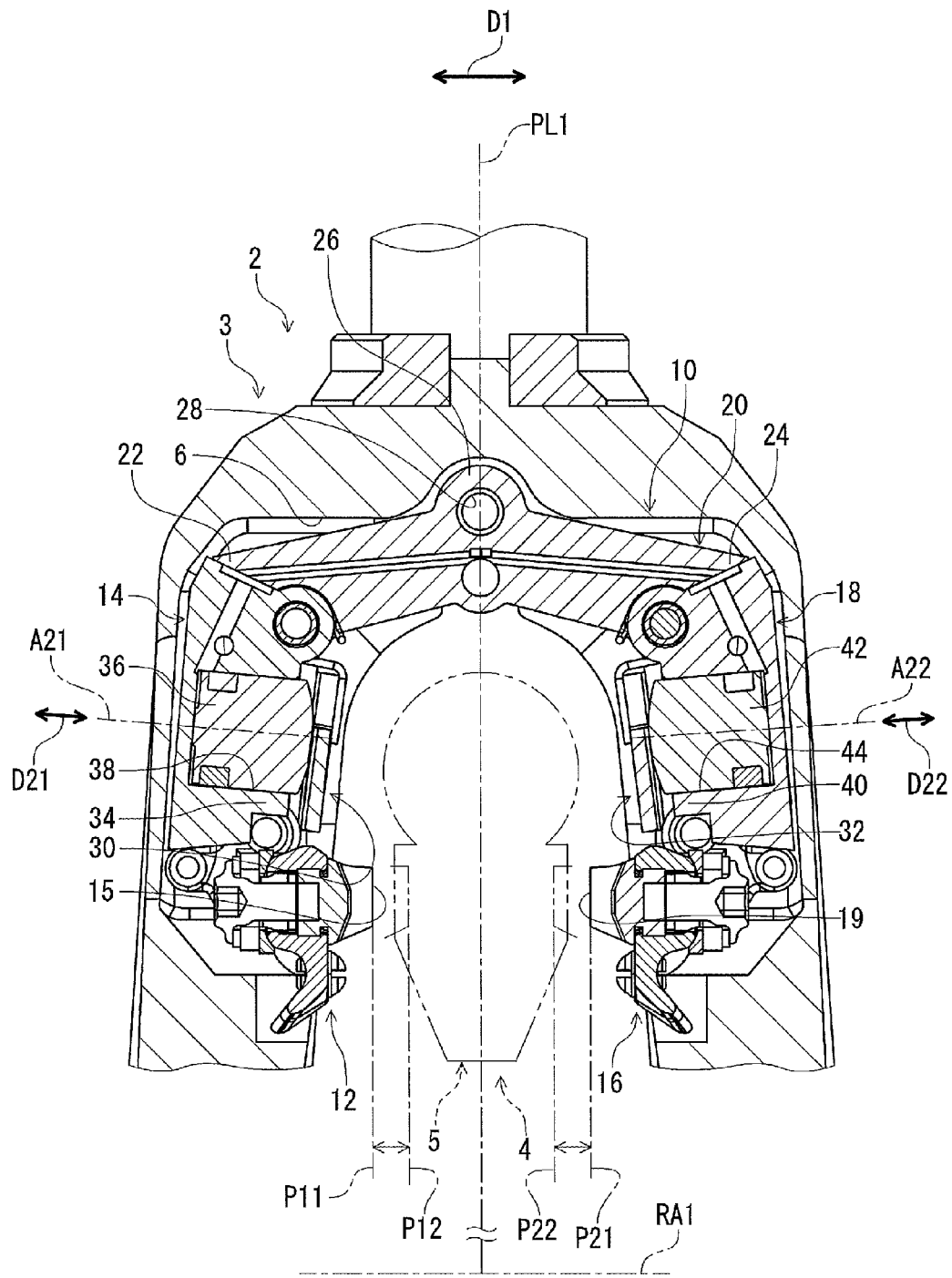
FIG. 3 is a cross-sectional view of the bicycle brake device taken along line III-III of FIG. 2.

As seen in FIG. 3, the base member 14 including a hydraulic cylinder 34. The bicycle brake device 10 comprises a piston 36 movable in the hydraulic cylinder 34 in a movement direction D21 so as to move the friction member 12 toward the rotatable member 4. The hydraulic cylinder 34 includes a cylinder bore 38 extending in the movement direction D21. The piston 36 is movably provided in the cylinder bore 38. The piston 36 has a center axis A21 parallel to the movement direction D21.

The additional base member 18 including an additional hydraulic cylinder 40. The bicycle brake device 10 comprises an additional piston 42 movable in the additional hydraulic cylinder 40 in an additional movement direction D22 so as to move the additional friction member 16 toward the rotatable member 4. The additional hydraulic cylinder 40 includes an additional cylinder bore 44 extending in the additional movement direction D22. The additional piston 42 is movably provided in the additional cylinder bore 44. The additional piston 42 has an additional center axis A22 parallel to the additional movement direction D22. The additional hydraulic cylinder 40 can also be referred to as the hydraulic cylinder 40. The additional piston 42 can also be referred to as the piston 42. The additional center axis A22 can also be referred to as the center axis A22.

Figure 4:
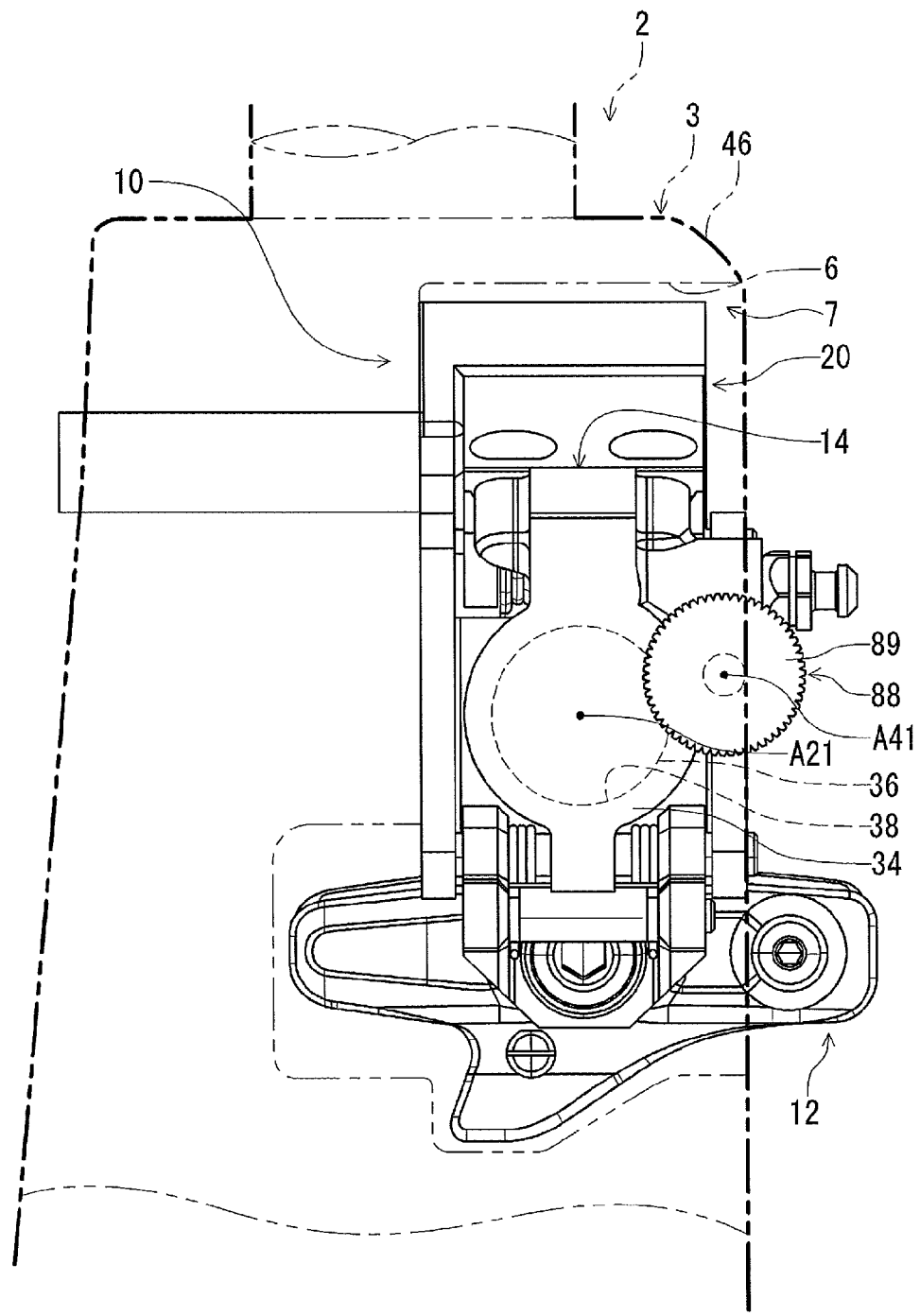
FIG. 4 is a side elevational view of the bicycle frame provided with the bicycle brake device illustrated in FIG. 1.

As seen in FIG. 4, the piston 36 is at least partially provided in a frame area 46 defined by an outline of the bicycle frame 2 when viewed from the movement direction D21 (FIG. 3) in the attachment state where the base member 14 is attached to the bicycle frame 2. In the illustrated embodiment, the piston 36 is entirely provided in the frame area 46 when viewed from the movement direction D21 in the attachment state. However, the piston 36 can be partially provided in the frame area 46 when viewed from the movement direction D21. In the illustrated embodiment, the frame area 46 is defined by an outline of the front fork 3 of the bicycle frame 2 when viewed from the movement direction D21 in the attachment state. The center axis A21 of the piston 36 is arranged in the frame area 46 when viewed from the movement direction D21 in the attachment state.

The hydraulic cylinder 34 is at least partially provided in the frame area 46 when viewed from the movement direction D21 in the attachment state. In the illustrated embodiment, the hydraulic cylinder 34 is entirely provided in the frame area 46 when viewed from the movement direction D21 in the attachment state. However, the hydraulic cylinder 34 can be partially provided in the frame area 46 when viewed from the movement direction D21 in the attachment state.

The base member 14 is at least partially provided in the frame area 46 when viewed from the movement direction D21 in the attachment state. In the illustrated embodiment, the base member 14 is entirely provided in the frame area 46 when viewed from the movement direction D21 in the attachment state. However, the base member 14 can be partially provided in the frame area 46 when viewed from the movement direction D21 in the attachment state.

As seen in FIG. 4, the piston 36 is at least partially provided in the arrangement recess 6 of the bicycle frame 2 in the attachment state. In the illustrated embodiment, the piston 36 is entirely provided in the arrangement recess 6 of the bicycle frame 2 in the attachment state. However, the piston 36 can be partially provided in the arrangement recess 6 of the bicycle frame 2 in the attachment state. The piston 36 is entirely provided in an internal space 7 of the bicycle frame 2 when viewed from the movement direction D21 in the attachment state. However, the piston 36 can be at least partially provided in the internal space 7 of the bicycle frame 2 when viewed from the movement direction D21 in the attachment state. The internal space 7 is defined between a first fork arm or blade 3a and a second fork arm or blade 3b of the front fork 3 and includes the arrangement recess 6.

The hydraulic cylinder 34 is at least partially provided in the arrangement recess 6 of the bicycle frame 2 in the attachment state. In the illustrated embodiment, the hydraulic cylinder 34 is entirely provided in the arrangement recess 6 of the bicycle frame 2 in the attachment state. However, the hydraulic cylinder 34 can be partially provided in the arrangement recess 6 of the bicycle frame 2 in the attachment state. The hydraulic cylinder 34 is entirely provided in the internal space 7 of the bicycle frame 2 when viewed from the movement direction D21 in the attachment state. However, the hydraulic cylinder 34 can at least partially provided in the internal space 7 of the bicycle frame 2 when viewed from the movement direction D21 in the attachment state.

The base member 14 is at least partially provided in the arrangement recess 6 of the bicycle frame 2 in the attachment state. In the illustrated embodiment, the base member 14 is entirely provided in the arrangement recess 6 of the bicycle frame 2 in the attachment state. However, the base member 14 can be partially provided in the arrangement recess 6 of the bicycle frame 2 in the attachment state. The base member 14 is entirely provided in the internal space 7 of the bicycle frame 2 when viewed from the movement direction D21 in the attachment state. However, the base member 14 can at least partially provided in the internal space 7 of the bicycle frame 2 when viewed from the movement direction D21 in the attachment state.

Figure 5:
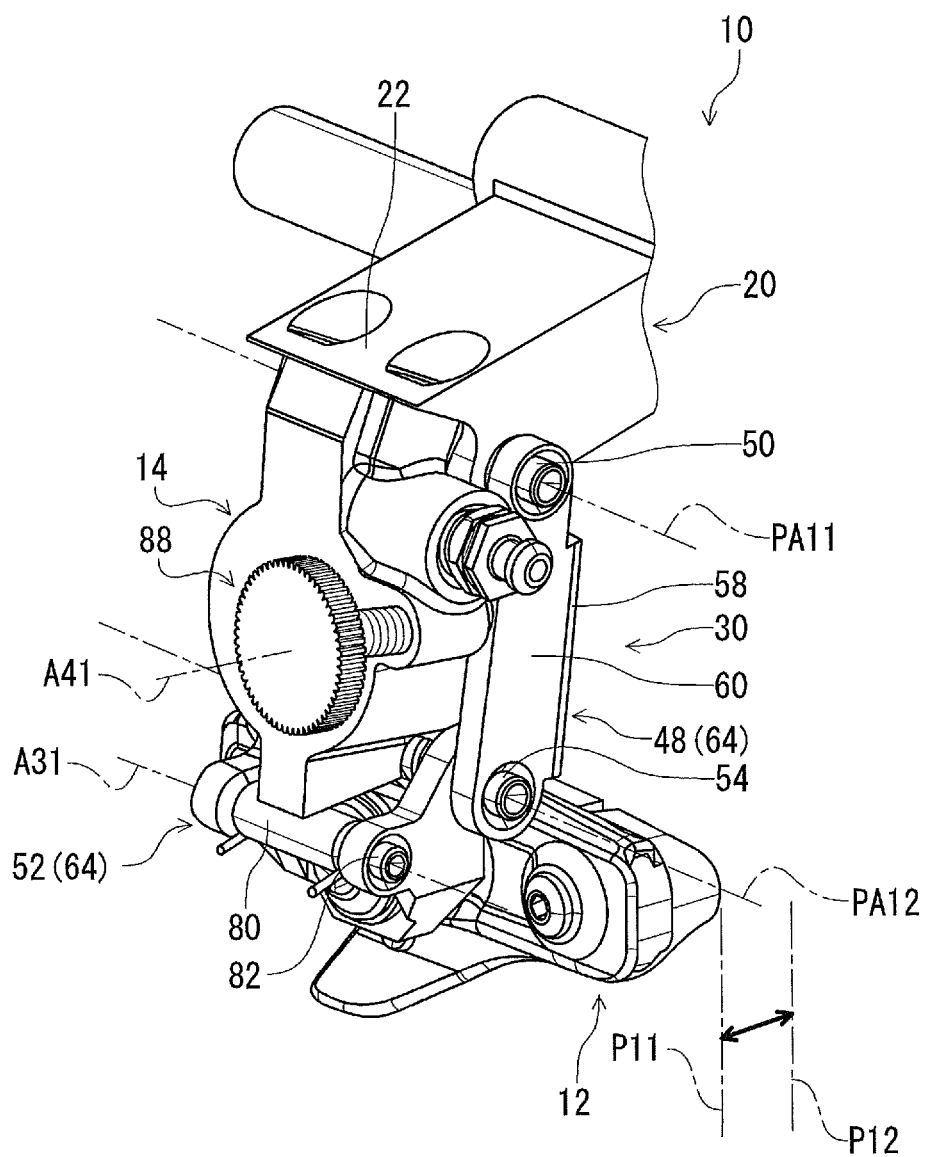
FIG. 5 is a partial perspective view of the bicycle brake device illustrated in FIG. 1.

As seen in FIG. 3, the piston 36 is configured to push the link structure 30 to move the friction member 12 from the rest position P11 toward the braking position P12. As seen in FIG. 5, the link structure 30 is configured to pivotably couple the friction member 12 to the base member 14 about a first pivot axis PA11. The link structure 30 includes a first link member 48 pivotably coupled to the base member 14 about the first pivot axis PA11. The piston 36 is configured to push the first link member 48 to move the friction member 12 from the rest position P11 toward the braking position P12.

As seen in FIG. 5, the link structure 30 includes a first link pin 50 configured to pivotably couple the first link member 48 to the base member 14 about the first pivot axis PA11. In the illustrated embodiment, the first link pin 50 is configured to pivotably couple the first link member 48 to the base member 14 and the coupling member 20 about the first pivot axis PA11.

As seen in FIG. 5, the link structure 30 includes a second link member 52 pivotably coupled to the first link member 48 about a second pivot axis PA12 parallel to the first pivot axis PA11. The friction member 12 is attached to the second link member 52. The link structure 30 includes a second link pin 54 configured to pivotably couple the second link member 52 to the first link member 48 about the second pivot axis PA12. The bicycle brake device 10 includes a coupling bolt 56 (FIG. 6) configured to couple the friction member 12 to the second link member 52. The friction member 12 is movable together with the second link member 52 relative to the base member 14.

Figure 6:
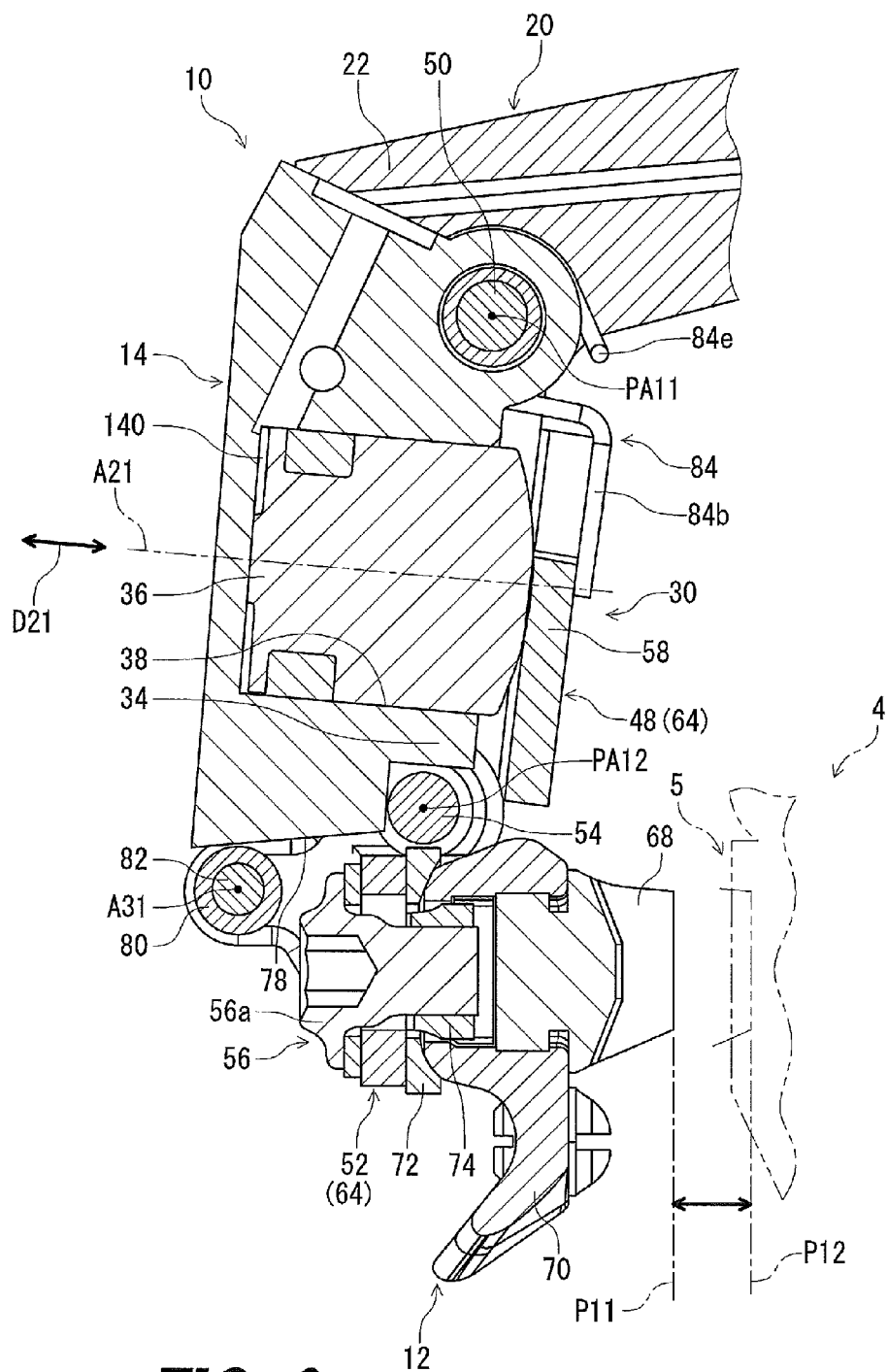
FIG. 6 is a partial cross-sectional view of the bicycle brake device illustrated in FIG. 1.

As seen in FIG. 6, the piston 36 is configured to be operatively coupled to the friction member 12. Specifically, the first link member 48 includes a receiving portion 58 contactable with the piston 36. The piston 36 is configured to push the receiving portion 58 of the first link member 48. The piston 36 is coupled to the first link member 48 without being fixed to the first link member 48. In the illustrated embodiment, the piston 36 is not secured to the first link member 48 and is merely contactable with the receiving portion 58 of the first link member 48. Namely, the piston 36 is coupled to the friction member 12 without being fixed to the friction member 12. The piston 36 is provided between the first pivot axis PA11 and the friction member 12. The piston 36 is provided between the first pivot axis PA11 and the second pivot axis PA12.

As seen in FIG. 5, the first link member 48 includes a first frame portion 60 pivotably coupled to the base member 14 about the first pivot axis PA11. The receiving portion 58 is secured to the first frame portion 60. The first frame portion 60 is pivotably coupled to the base member 14 about the first pivot axis PA11 via the first link pin 50. The first frame portion 60 is pivotably coupled to the second link member 52 about the second pivot axis PA12 via the second link pin 54. The first frame portion 60 extends from the first pivot axis PA11 to the second pivot axis PA12.

Figure 7:
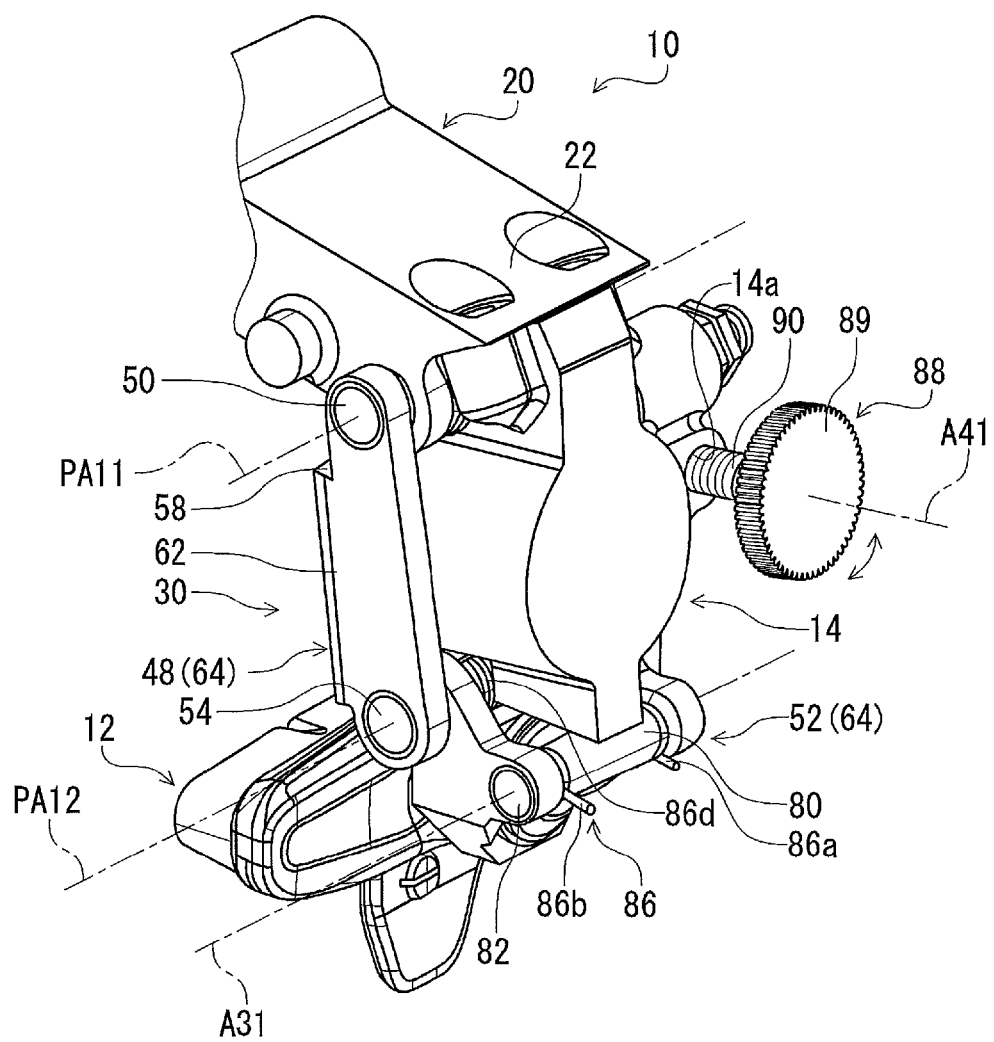
FIG. 7 is a partial perspective view of the bicycle brake device illustrated in FIG. 1.

As seen in FIG. 7, the first link member 48 includes a second frame portion 62 pivotably coupled to the base member 14 about the first pivot axis PA11. The receiving portion 58 is secured to the second frame portion 62. The second frame portion 62 is pivotably coupled to the base member 14 about the first pivot axis PA11 via the first link pin 50. The second frame portion 62 is pivotably coupled to the second link member 52 about the second pivot axis PA12 via the second link pin 54. The second frame portion 62 extends from the first pivot axis PA11 to the second pivot axis PA12.

Namely, as seen in FIG. 6, the bicycle brake device 10 further comprises an intermediate member 64 provided between the piston 36 and the friction member 12 such that the intermediate member 64 moves the friction member 12 in response to movement of the piston 36. In the illustrated embodiment, the intermediate member 64 can also be referred to as at least one of the first link member 48 and the second link member 52.

Figure 8:
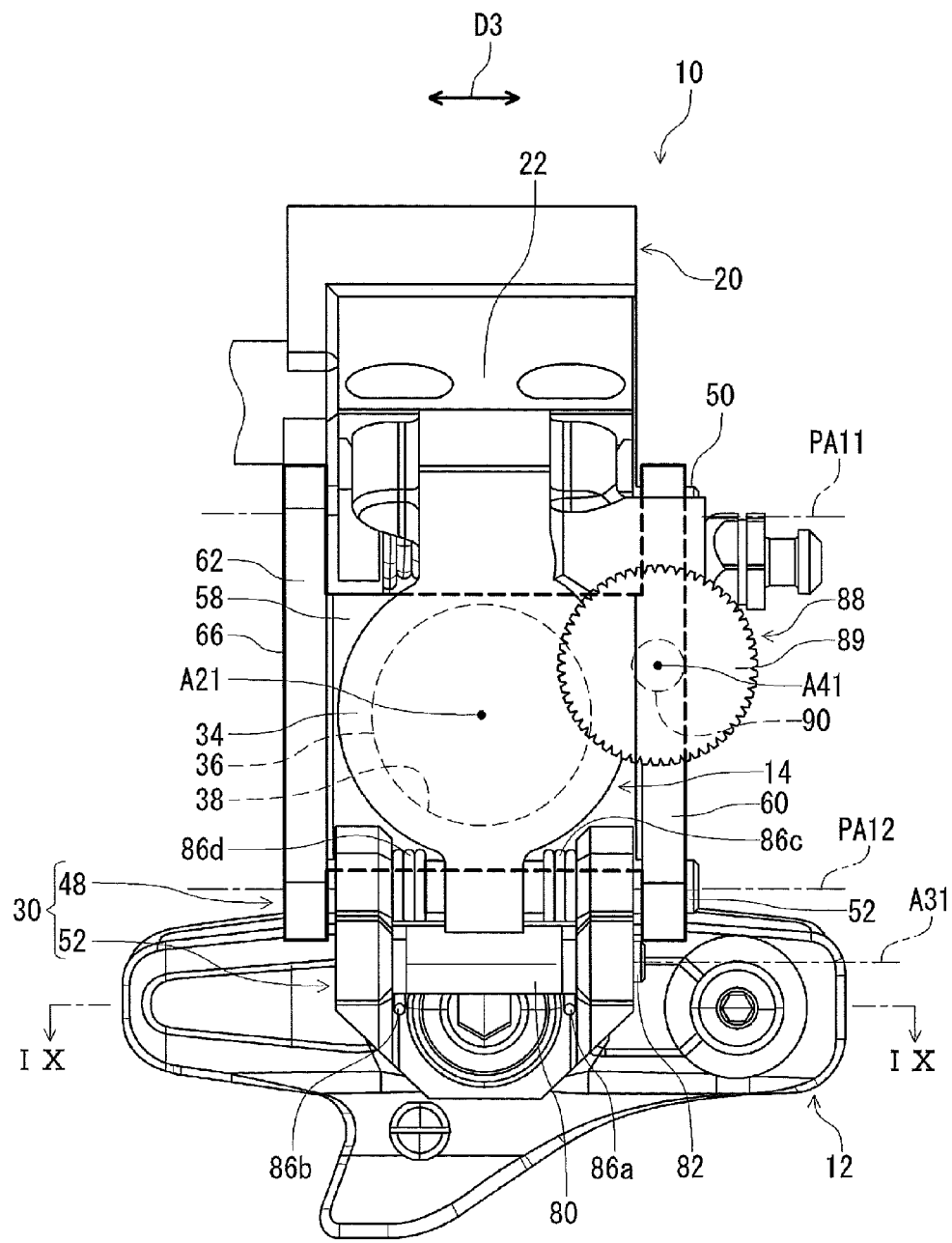
FIG. 8 is a side elevational view of the bicycle brake device illustrated in FIG. 1.

As seen in FIG. 8, the first frame portion 60 is spaced apart from the second frame portion 62 in an axial direction D3 parallel to the first pivot axis PA11. The receiving portion 58 is provided between the first frame portion 60 and the second frame portion 62 in the axial direction D3 and couples the first frame portion 60 to the second frame portion 62.

As seen in FIG. 8, the piston 36 is at least partially provided in a link area 66 defined by an outline of the first link member 48 when viewed from the movement direction D21. In FIG. 8, the link area 66 is indicated with a thick line. In the illustrated embodiment, the piston 36 is entirely provided in the link area 66 when viewed from the movement direction D21. The center axis A21 is provided in the link area 66 when viewed from the movement direction D21. The link area 66 is defined by the receiving portion 58, the first frame portion 60, and the second frame portion 62.

Figure 9:
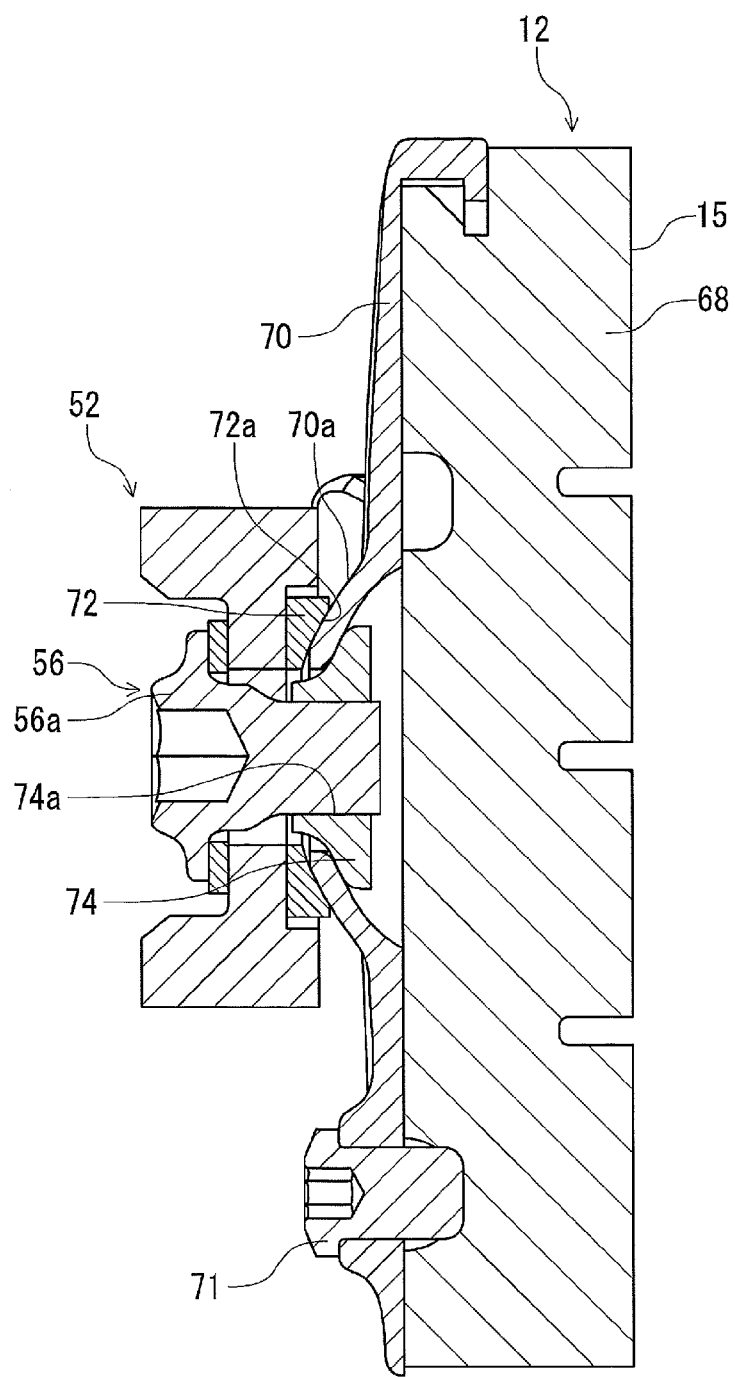
FIG. 9 is a cross-sectional view of the bicycle brake device taken along line IX-IX of FIG. 8.

As seen in FIG. 9, the friction member 12 is attached to the second link member 52 so that an orientation of the friction member 12 is adjustable relative to the second link member 52. In the illustrated embodiment, the friction member 12 includes a brake shoe 68, a shoe attachment member 70, a fastener 71, an adjustment washer 72, and a nut element 74. The brake shoe 68 includes the friction surface 15 and is attached to the shoe attachment member 70. The shoe attachment member 70 includes a first curved surface 70a opposite to the friction surface 15. The fastener 71 is attached to the shoe attachment member 70 to position the brake shoe 68 with respect to the shoe attachment member 70.

The adjustment washer 72 is provided between the shoe attachment member 70 and the second link member 52 and includes a second curved surface 72a. The second curved surface 72a has a complementary shape relative to the first curved surface 70a. In the illustrated embodiment, the first curved surface 70a is a convex surface, and the second curved surface 72a is a concave surface.

The nut element 74 includes an attachment hole 74a having an internal thread. The coupling bolt 56 is threadedly engaged with the attachment hole 74a of the nut element 74. The second link member 52 is sandwiched between the adjustment washer 72 and a head portion 56a of the coupling bolt 56. Orientation of the brake shoe 68 is adjustable relative to the second link member 52 along the first curved surface 70a and the second curved surface 72a.

Figure 10:
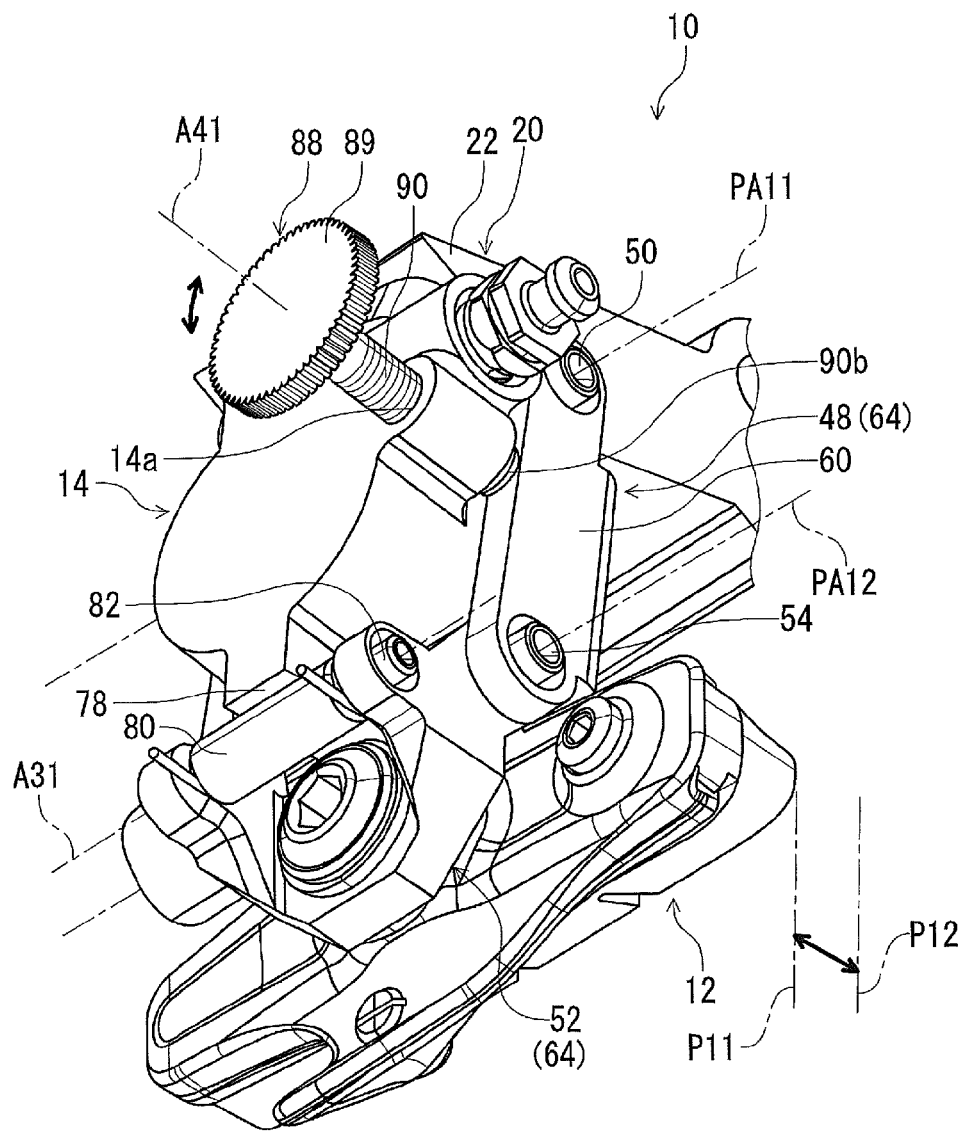
FIG. 10 is a partial perspective view of the bicycle brake device illustrated in FIG. 1.

As seen in FIGS. 6 and 10, the base member 14 is configured to guide the second link member 52 to maintain an orientation of the friction surface 15 of the friction member 12 between the rest position P11 and the braking position P12. The base member 14 includes a guide surface 78. The link structure 30 includes a guide member 80 mounted on the second link member 52. The guide member 80 is rotatably mounted on the second link member 52. In the illustrated embodiment, the second link member 52 includes a support rod 82. The guide member 80 is rotatably mounted on the support rod 82 about a guide rotational axis A31. The guide member 80 is in contact with the guide surface 78 to maintain an orientation of the friction surface 15 of the friction member 12 between the rest position P11 and the braking position P12.

Figure 11:
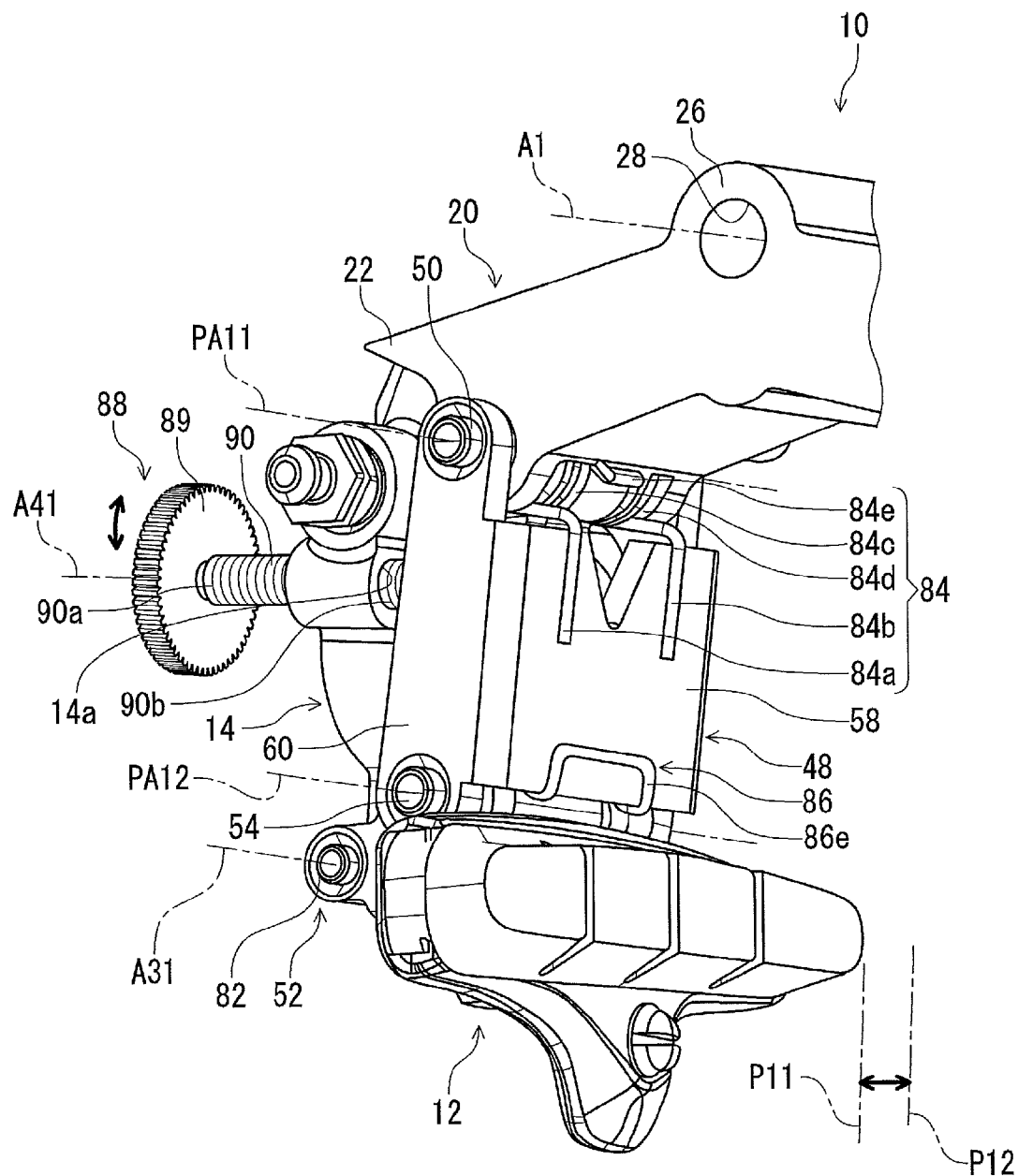
FIG. 11 is a partial perspective view of the bicycle brake device illustrated in FIG. 1.

As seen in FIG. 11, the bicycle brake device 10 further comprises a first biasing member 84 configured to bias the first link member 48 relative to the base member 14 toward the piston 36. In the illustrated embodiment, the first biasing member 84 is a torsion spring and is mounted to the first link pin 50. The first biasing member 84 includes a first end 84a, a second end 84b, a first coiled body 84c, a second coiled body 84d, and a first intermediate portion 84e. The first end 84a extends from the first coiled body 84c. The second end 84b extends from the second coiled body 84d. The first intermediate portion 84e is provided between the first coiled body 84c and the second coiled body 84d and couples the first coiled body 84c to the second coiled body 84d. The first link pin 50 extends through the first coiled body 84c and the second coiled body 84d. The first end 84a and the second end 84b are engaged with the receiving portion 58 of the first link member 48. The first intermediate portion 84e are engaged with the coupling member 20.

As seen in FIGS. 8, 9, and 11, the bicycle brake device 10 further comprises a second biasing member 86 configured to bias the second link member 52 relative to the first link member 48 toward the base member 14. In the illustrated embodiment, the second biasing member 86 is a torsion spring and is mounted to the second link pin 54. The second biasing member 86 includes a third end 86a, a fourth end 86b, a third coiled body 86c, a fourth coiled body 86d, and a second intermediate portion 86e (FIG. 11). The third end 86a extends from the third coiled body 86c. The fourth end 86b extends from the fourth coiled body 86d. The second link pin 54 extends through the third coiled body 86c and the fourth coiled body 86d. The third end 86a and the fourth end 86b are engaged with the support rod 82 of the second link member 52.

As seen in FIG. 11, the second intermediate portion 86e is provided between the third coiled body 86c and the fourth coiled body 86d and couples the third coiled body 86c and the fourth coiled body 86d. The second intermediate portion 86e are engaged with the receiving portion 58 of the first link member 48.

As seen in FIG. 10, the bicycle brake device 10 further comprises a clearance adjustment member 88 configured to adjust the rest position P11 of the friction member 12 relative to the hydraulic cylinder 34. The clearance adjustment member 88 includes an operating portion 89 configured to be operated by the user to adjust the rest position P11 of the friction member 12. In the illustrated embodiment, the operating portion 89 has a disk shape such that the operating portion 89 can be operated without any tools. In other words, the clearance adjustment member 88 is configured as a tool-less adjustment member.

As seen in FIGS. 10 and 11, the clearance adjustment member 88 includes an adjustment rod 90 rotatably mounted to the base member 14 about an adjustment rotational axis A41. The adjustment rod 90 includes a first rod end 90a and a second rod end 90b opposite to the first rod end 90a along the adjustment rotational axis A41. The operating portion 89 is provided at the first rod end 90a. The second rod end 90b is in contact with the first link member 48. In the illustrated embodiment, the second rod end 90b is in contact with the first frame portion 60 of the first link member 48.

As seen in FIG. 11, the adjustment rod 90 includes an external thread. The base member 14 includes a threaded hole 14a. The adjustment rod 90 is threadedly engaged with the threaded hole 14a via the external thread. Rotation of the clearance adjustment member 88 relative to the base member 14 moves the clearance adjustment member 88 relative to the base member 14 along the adjustment rotational axis A41, changing a position of the first link member 48 relative the base member 14. This can change the rest position P11 of the friction member 12. The first biasing member 84 is configured to push the first link member 48 against the second rod end 90b of the adjustment rod 90.

As seen in FIG. 4, the operating portion 89 is at least partially provided in the frame area 46 when viewed from the movement direction D21 in the attachment state. In the illustrated embodiment, the operating portion 89 is partially provided in the frame area 46 when viewed from the movement direction D21 in the attachment state. However, the operating portion 89 can be entirely provided in the frame area 46 when viewed from the movement direction D21 in the attachment state.

The adjustment rod 90 is at least partially provided in the frame area 46 when viewed from the movement direction D21 in the attachment state. In the illustrated embodiment, the adjustment rod 90 is entirely provided in the frame area 46 when viewed from the movement direction D21 in the attachment state. However, the adjustment rod 90 can be partially provided in the frame area 46 or entirely provided outside the frame area 46 when viewed from the movement direction D21 in the attachment state. While the adjustment rotational axis A41 is provided in the frame area 46 when viewed from the movement direction D21 in the attachment state, the adjustment rotational axis A41 can be provided outside the frame area 46 when viewed from the movement direction D21 in the attachment state.

As seen in FIG. 8, the operating portion 89 is at least partially provided in the link area 66 when viewed from the movement direction D21 in the attachment state. In the illustrated embodiment, the operating portion 89 is partially provided in the link area 66 when viewed from the movement direction D21 in the attachment state. However, the operating portion 89 can be entirely provided in the link area 66 when viewed from the movement direction D21 in the attachment state.

The adjustment rod 90 is at least partially provided in the link area 66 when viewed from the movement direction D21 in the attachment state. In the illustrated embodiment, the adjustment rod 90 is entirely provided in the link area 66 when viewed from the movement direction D21 in the attachment state. However, the adjustment rod 90 can be partially provided in the link area 66 or entirely provided outside the link area 66 when viewed from the movement direction D21 in the attachment state. While the adjustment rotational axis A41 is provided in the link area 66 when viewed from the movement direction D21 in the attachment state, the adjustment rotational axis A41 can be provided outside the link area 66 when viewed from the movement direction D21 in the attachment state.

Figure 12:
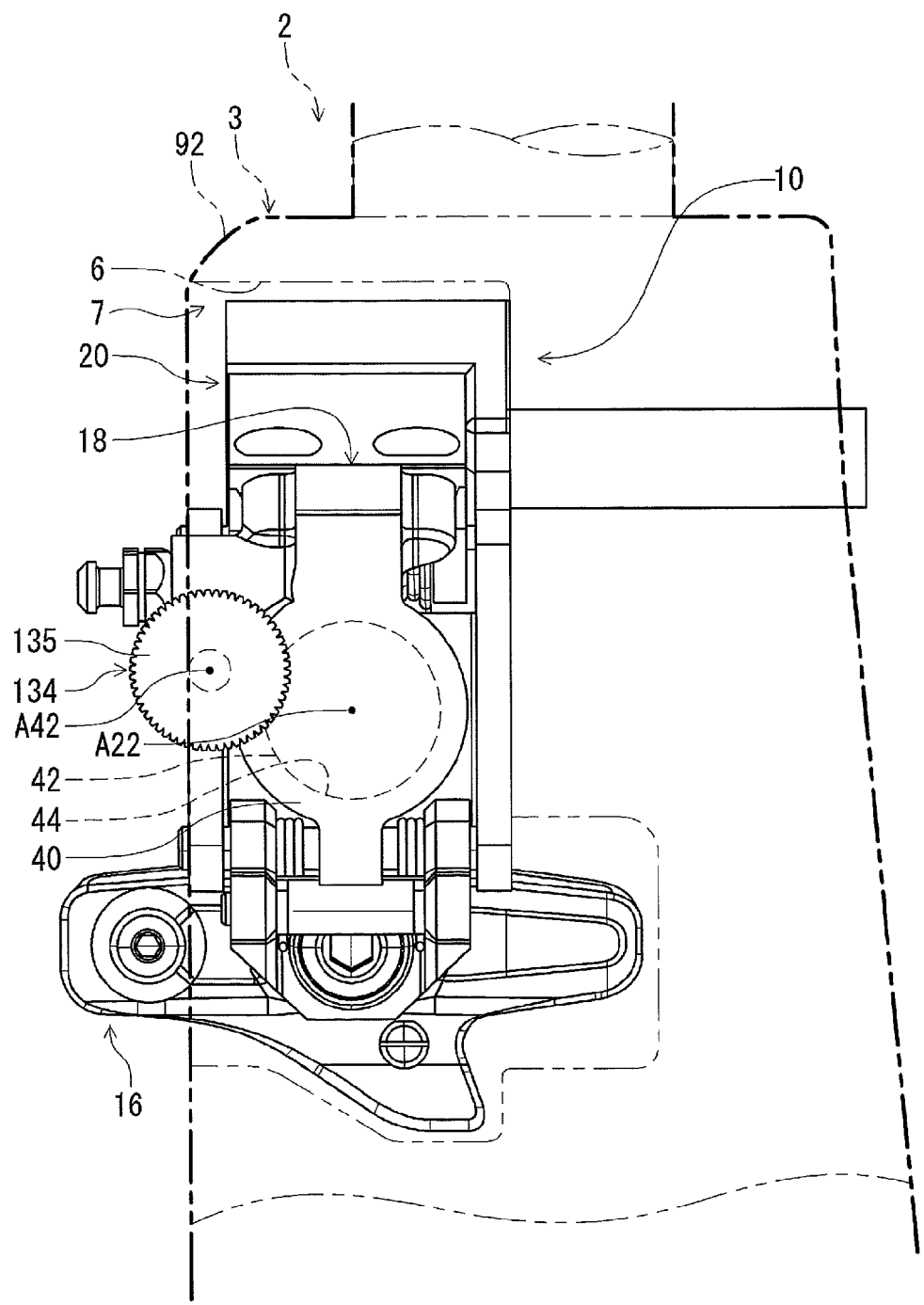
FIG. 12 is a side elevational view of the bicycle frame provided with the bicycle brake device illustrated in FIG. 1.

As seen in FIG. 12, the piston 42 is at least partially provided in a frame area 92 defined by the outline of the bicycle frame 2 when viewed from the movement direction D22 (FIG. 3) in the attachment state where the base member 18 is attached to the bicycle frame 2. In the illustrated embodiment, the piston 42 is entirely provided in the frame area 92 when viewed from the movement direction D22 in the attachment state. However, the piston 42 can be partially provided in the frame area 92 when viewed from the movement direction D22. In the illustrated embodiment, the frame area 92 is defined by an outline of the front fork 3 of the bicycle frame 2 when viewed from the movement direction D22 in the attachment state. The center axis A22 of the piston 42 is arranged in the frame area 92 when viewed from the movement direction D22 in the attachment state.

The hydraulic cylinder 40 is at least partially provided in the frame area 92 where viewed from the movement direction D22 in the attachment state. In the illustrated embodiment, the hydraulic cylinder 40 is entirely provided in the frame area 92 where viewed from the movement direction D22 in the attachment state. However, the hydraulic cylinder 40 can be partially provided in the frame area 92 where viewed from the movement direction D22 in the attachment state.

The base member 18 is at least partially provided in the frame area 92 where viewed from the movement direction D22 in the attachment state. In the illustrated embodiment, the base member 18 is entirely provided in the frame area 92 where viewed from the movement direction D22 in the attachment state. However, the base member 18 can be partially provided in the frame area 92 where viewed from the movement direction D22 in the attachment state.

As seen in FIG. 12, the piston 42 is at least partially provided in the arrangement recess 6 of the bicycle frame 2 in the attachment state. In the illustrated embodiment, the piston 42 is entirely provided in the arrangement recess 6 of the bicycle frame 2 in the attachment state. However, the piston 42 is partially provided in the arrangement recess 6 of the bicycle frame 2 in the attachment state. The piston 42 is entirely provided in the internal space 7 of the bicycle frame 2 when viewed from the movement direction D22 in the attachment state. However, the piston 42 can be at least partially provided in the internal space 7 of the bicycle frame 2 when viewed from the movement direction D22 in the attachment state.

The hydraulic cylinder 40 is at least partially provided in the arrangement recess 6 of the bicycle frame 2 in the attachment state. In the illustrated embodiment, the hydraulic cylinder 40 is entirely provided in the arrangement recess 6 of the bicycle frame 2 in the attachment state. However, the hydraulic cylinder 40 can be partially provided in the arrangement recess 6 of the bicycle frame 2 in the attachment state. The hydraulic cylinder 40 is entirely provided in the internal space 7 of the bicycle frame 2 when viewed from the movement direction D22 in the attachment state. However, the hydraulic cylinder 40 can at least partially provided in the internal space 7 of the bicycle frame 2 when viewed from the movement direction D22 in the attachment state.

The base member 18 is at least partially provided in the arrangement recess 6 of the bicycle frame 2 in the attachment state. In the illustrated embodiment, the base member 18 is entirely provided in the arrangement recess 6 of the bicycle frame 2 in the attachment state. However, the base member 18 can be partially provided in the arrangement recess 6 of the bicycle frame 2 in the attachment state. The base member 18 is entirely provided in the internal space 7 of the bicycle frame 2 when viewed from the movement direction D22 in the attachment state. However, the base member 18 can at least partially provided in the internal space 7 of the bicycle frame 2 when viewed from the movement direction D22 in the attachment state.

Figure 13:
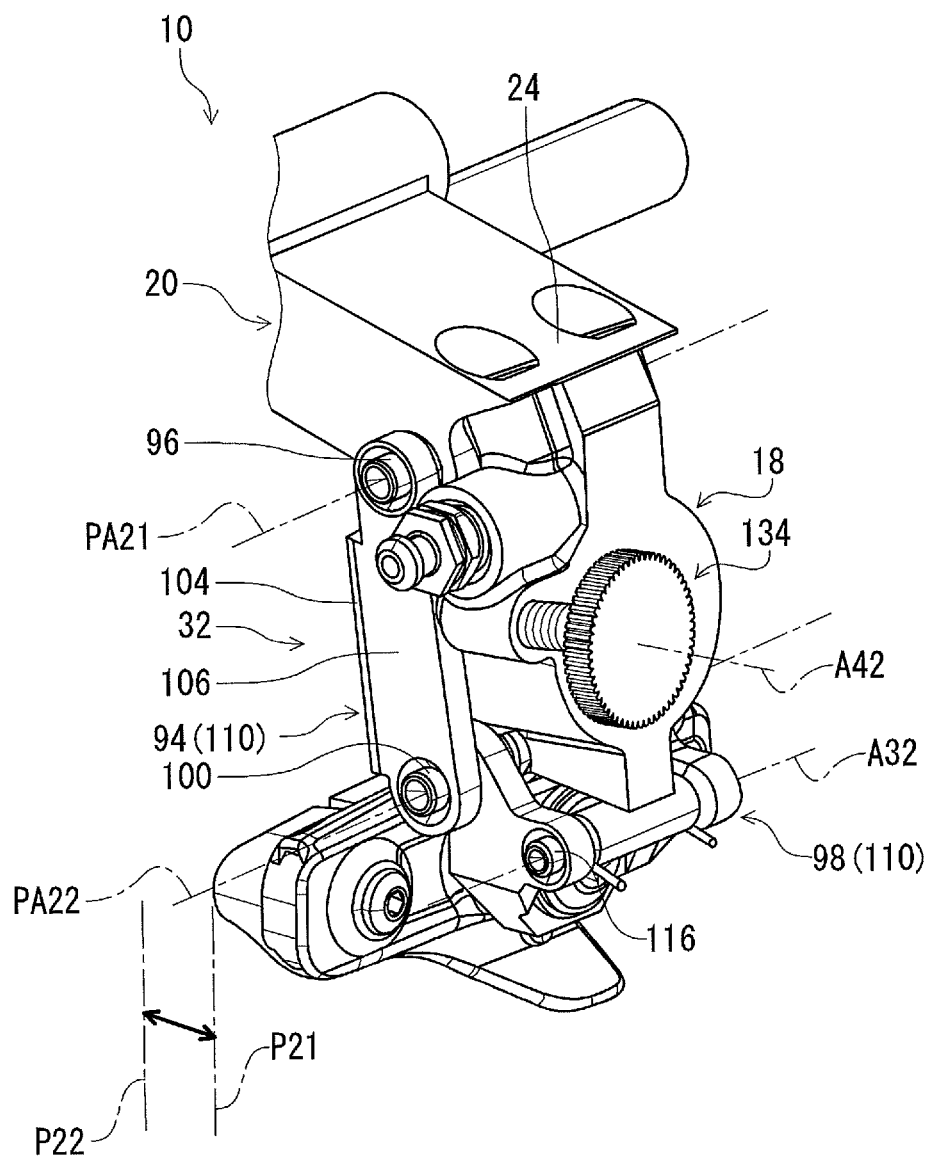
FIG. 13 is a partial perspective view of the bicycle brake device illustrated in FIG. 1.

As seen in FIG. 3, the additional piston 42 is configured to push the additional link structure 32 to move the additional friction member 16 from the additional rest position P21 toward the additional braking position P22. As seen in FIG. 13, the link structure 32 is configured to pivotably couple the friction member 16 to the base member 18 about a first pivot axis PA21. The link structure 32 includes a first link member 94 pivotably coupled to the base member 18 about the first pivot axis PA21. The piston 42 is configured to push the first link member 94 to move the friction member 16 from the rest position P21 toward the braking position P22.

As seen in FIG. 13, the link structure 32 includes a first link pin 96 configured to pivotably couple the first link member 94 to the base member 18 about the first pivot axis PA21. In the illustrated embodiment, the first link pin 96 is configured to pivotably couple the first link member 94 to the base member 18 and the coupling member 20 about the first pivot axis PA21.

As seen in FIG. 13, the link structure 32 includes a second link member 98 pivotably coupled to the first link member 94 about a second pivot axis PA22 parallel to the first pivot axis PA21. The friction member 16 is attached to the second link member 98. The link structure 32 includes a second link pin 100 configured to pivotably couple the second link member 98 to the first link member 94 about the second pivot axis PA22. The bicycle brake device 10 includes a coupling bolt 102 (FIG. 14) configured to couple the friction member 16 to the second link member 98. The friction member 16 is movable together with the second link member 98 relative to the base member 18.

Figure 14:
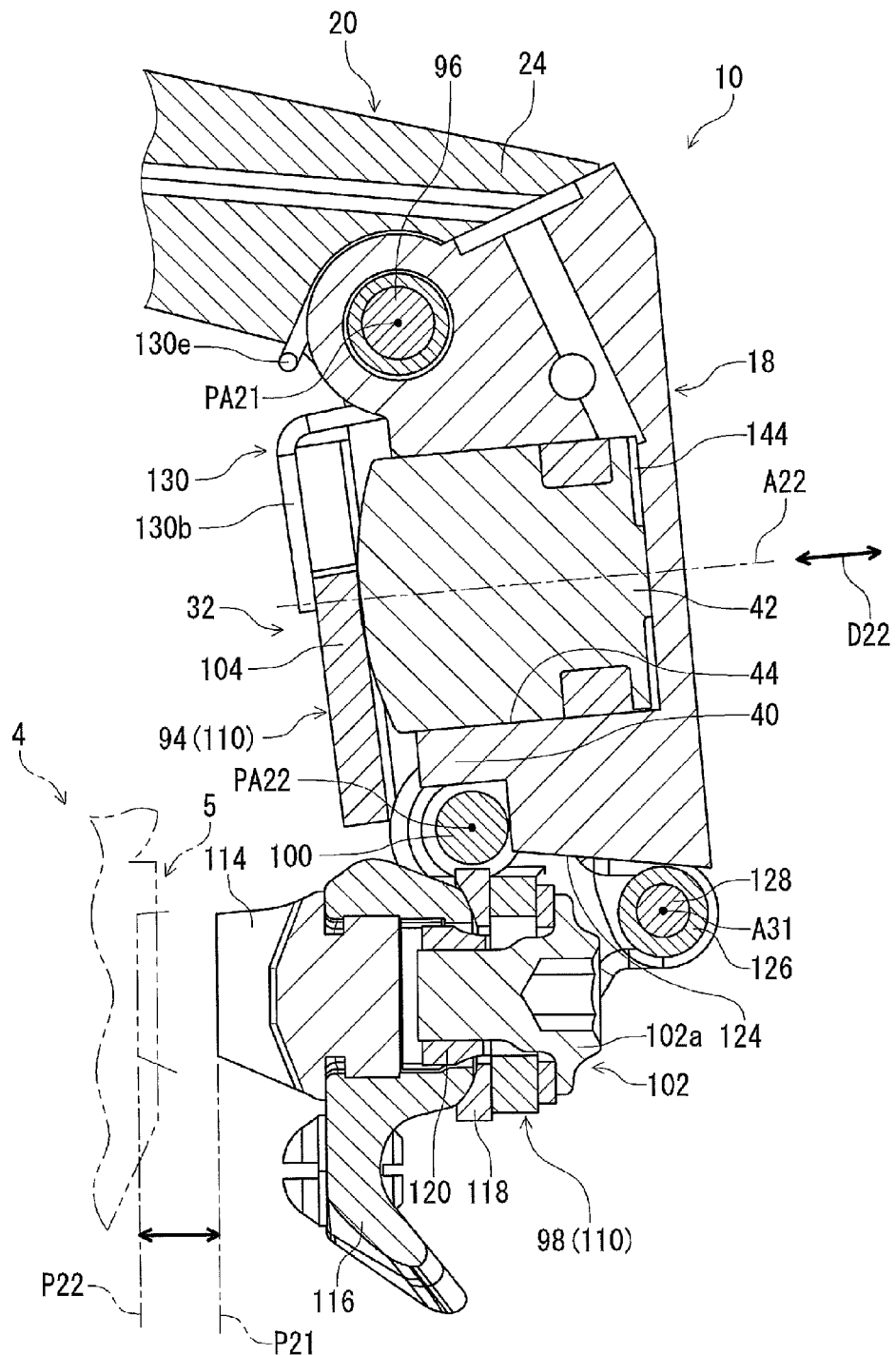
FIG. 14 is a partial cross-sectional view of the bicycle brake device illustrated in FIG. 1.

As seen in FIG. 14, the additional piston 42 is configured to be operatively coupled to the additional friction member 16. Specifically, the first link member 94 includes a receiving portion 104 contactable with the piston 42. The piston 42 is configured to push the receiving portion 104 of the first link member 94. The piston 42 is coupled to the first link member 94 without being fixed to the first link member 94. In the illustrated embodiment, the piston 42 is not secured to the first link member 94 and is merely contactable with the receiving portion 104 of the first link member 94. Namely, the piston 42 is coupled to the friction member 16 without being fixed to the friction member 16. The piston 42 is provided between the first pivot axis PA21 and the friction member 16. The piston 42 is provided between the first pivot axis PA21 and the second pivot axis PA22.

As seen in FIG. 13, the first link member 94 includes a first frame portion 106 pivotably coupled to the base member 18 about the first pivot axis PA21. The receiving portion 104 is secured to the first frame portion 106. The first frame portion 106 is pivotably coupled to the base member 18 about the first pivot axis PA21 via the first link pin 96. The first frame portion 106 is pivotably coupled to the second link member 98 about the second pivot axis PA22 via the second link pin 100. The first frame portion 106 extends from the first pivot axis PA21 to the second pivot axis PA22.

Figure 15:
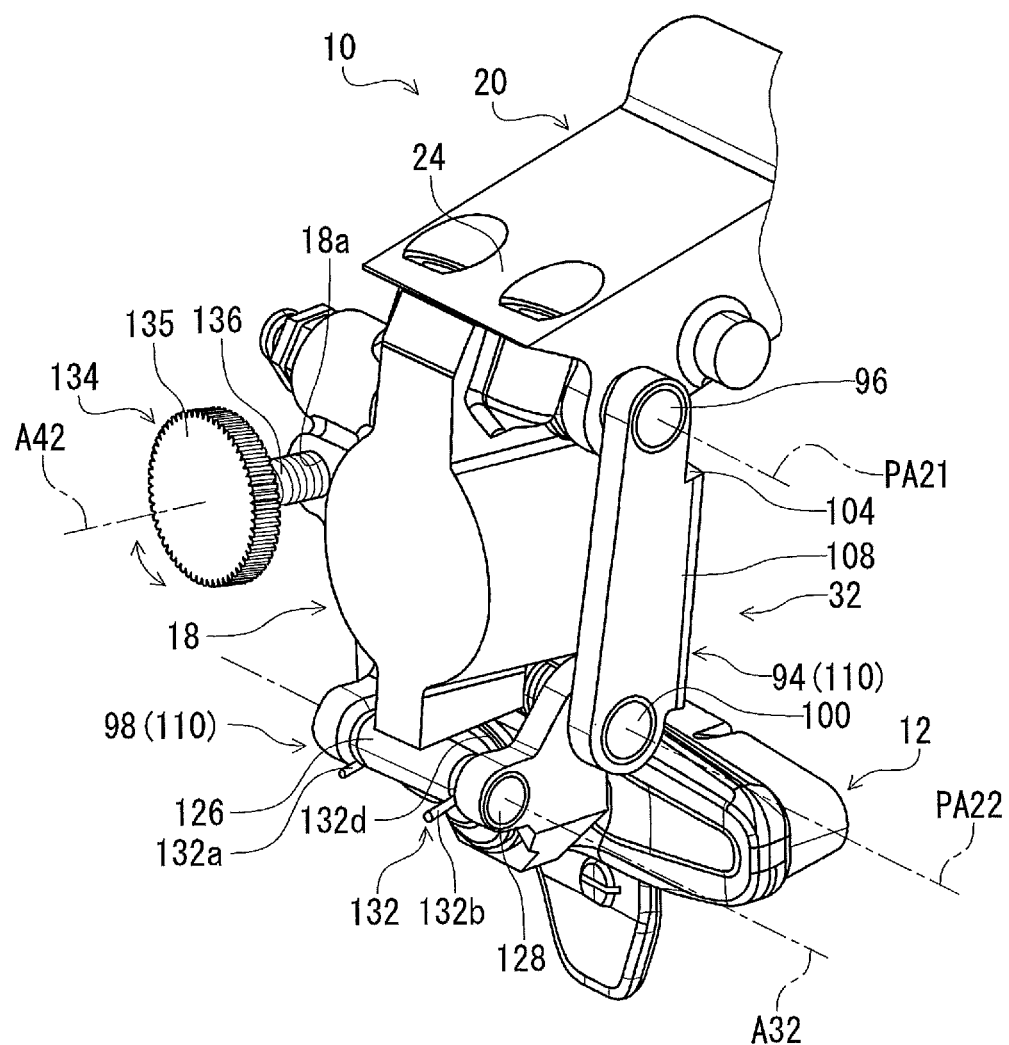
FIG. 15 is a partial perspective view of the bicycle brake device illustrated in FIG. 1.

As seen in FIG. 15, the first link member 94 includes a second frame portion 108 pivotably coupled to the base member 18 about the first pivot axis PA21. The receiving portion 104 is secured to the second frame portion 108. The second frame portion 108 is pivotably coupled to the base member 18 about the first pivot axis PA21 via the first link pin 96. The second frame portion 108 is pivotably coupled to the second link member 98 about the second pivot axis PA22 via the second link pin 100. The second frame portion 108 extends from the first pivot axis PA21 to the second pivot axis PA22.

Namely, as seen in FIG. 14, the bicycle brake device 10 further comprises an intermediate member 110 provided between the piston 42 and the friction member 16 such that the intermediate member 110 moves the friction member 16 in response to movement of the piston 42. In the illustrated embodiment, the intermediate member 110 can also be referred to as at least one of the first link member 94 and the second link member 98.

Figure 16:
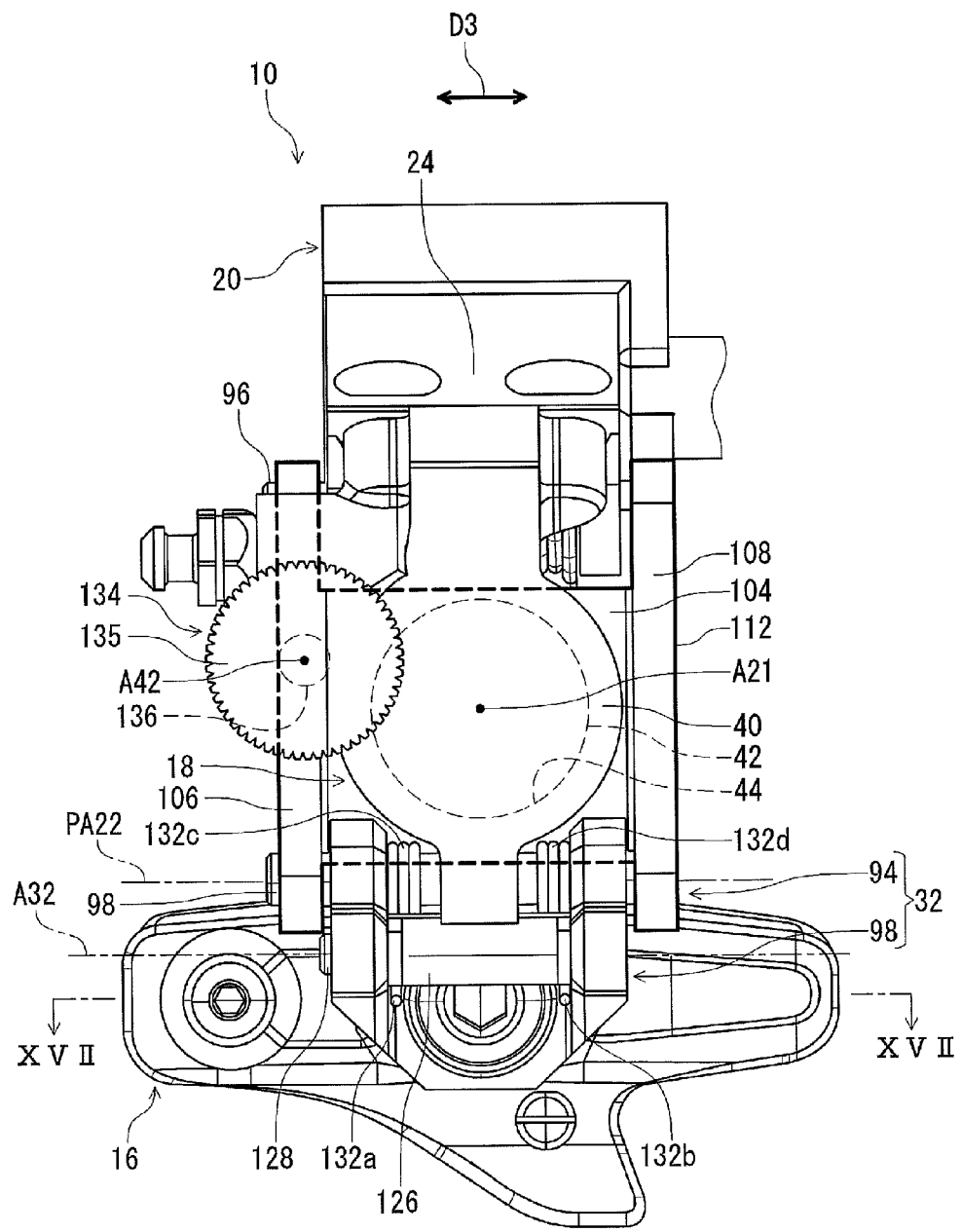
FIG. 16 is a side elevational view of the bicycle brake device illustrated in FIG. 1.

As seen in FIG. 16, the first frame portion 106 is spaced apart from the second frame portion 108 in the axial direction D3 parallel to the first pivot axis PA21. The receiving portion 104 is provided between the first frame portion 106 and the second frame portion 108 in the axial direction D3 and couples the first frame portion 106 to the second frame portion 108.

As seen in FIG. 16, the piston 42 is at least partially provided in a link area 112 defined by an outline of the first link member 94 when viewed from the movement direction D22. In FIG. 16, the link area 112 is indicated with a thick line. In the illustrated embodiment, the piston 42 is entirely provided in the link area 112 when viewed from the movement direction D22. The center axis A22 is provided in the link area 112 when viewed from the movement direction D22. The link area 112 is defined by the receiving portion 104, the first frame portion 106, and the second frame portion 108.

Figure 17:
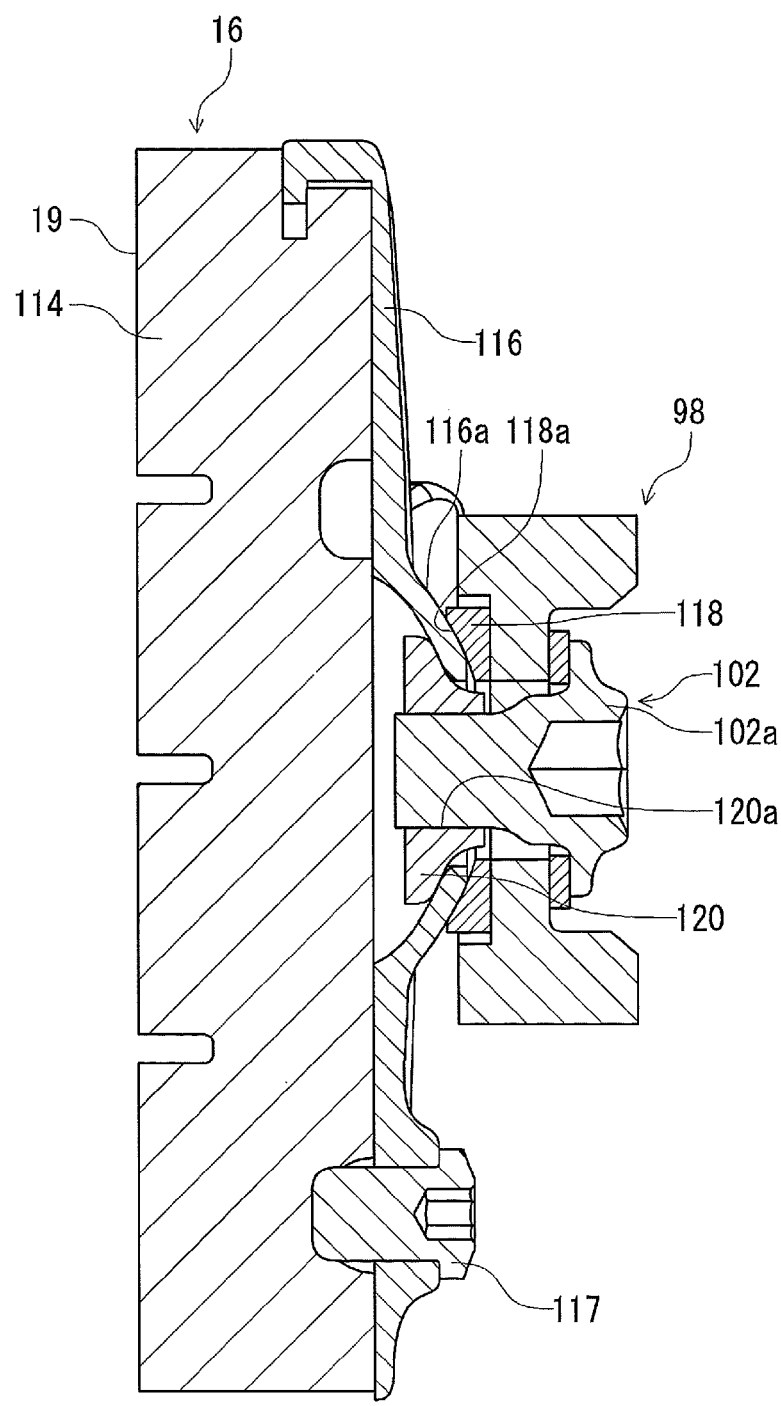
FIG. 17 is a cross-sectional view of the bicycle brake device taken along line XVII-XVII of FIG. 16.

As seen in FIG. 17, the friction member 16 is attached to the second link member 98 so that an orientation of the friction member 16 is adjustable relative to the second link member 98. In the illustrated embodiment, the friction member 16 includes a brake shoe 114, a shoe attachment member 116, a fastener 117, an adjustment washer 118, and a nut element 120. The brake shoe 114 includes the friction surface 19 and is attached to the shoe attachment member 116. The shoe attachment member 116 includes a first curved surface 116a opposite to the friction surface 15. The fastener 117 is attached to the shoe attachment member 116 to position the brake shoe 114 with respect to the shoe attachment member 116.

The adjustment washer 118 is provided between the shoe attachment member 116 and the second link member 98 and includes a second curved surface 118a. The second curved surface 118a has a complementary shape relative to the first curved surface 116a. In the illustrated embodiment, the first curved surface 116a is a convex surface, and the second curved surface 118a is a concave surface.

The nut element 120 includes an attachment hole 120a having an internal thread. The coupling bolt 102 is threadedly engaged with the attachment hole 120a of the nut element 120. The second link member 98 is sandwiched between the adjustment washer 118 and a head portion 102a of the coupling bolt 102. Orientation of the brake shoe 114 is adjustable relative to the second link member 98 along the first curved surface 116a and the second curved surface 118a.

Figure 18:
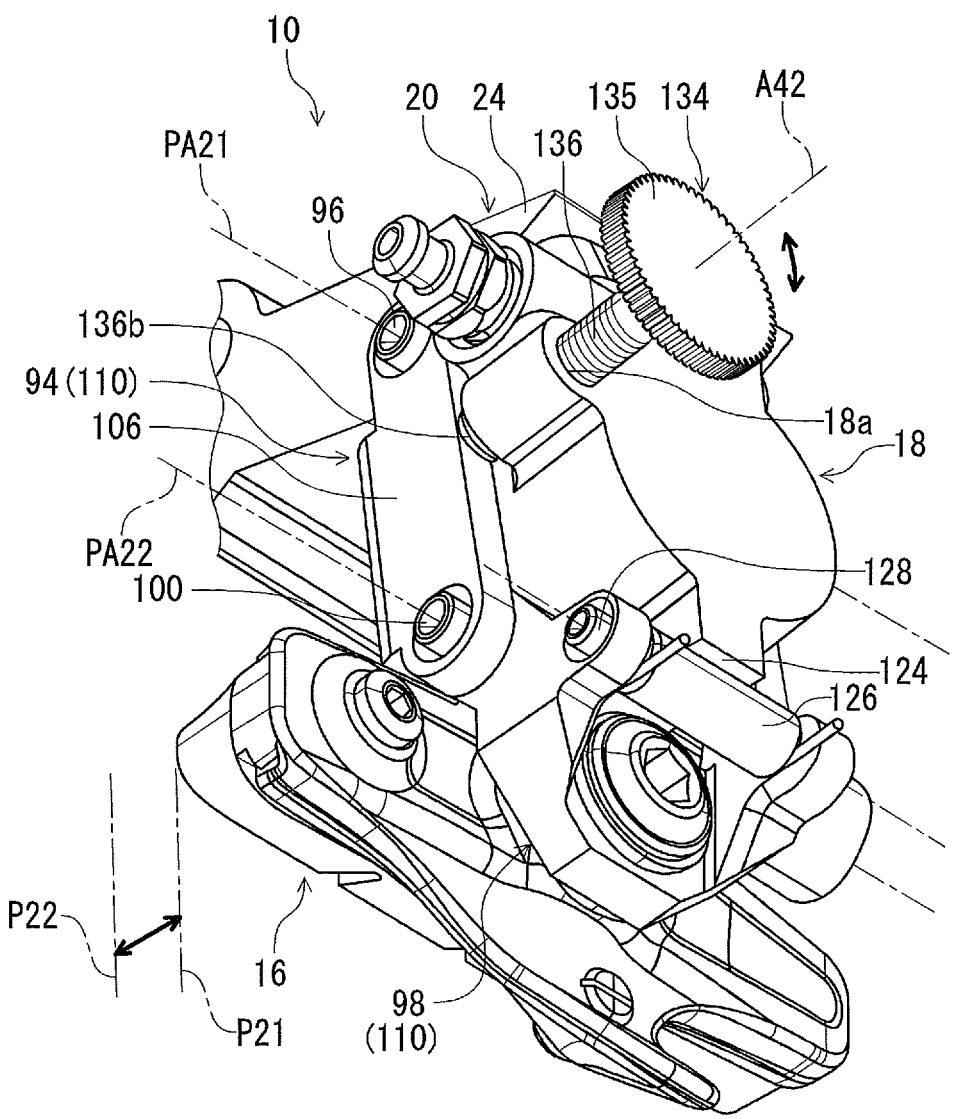
FIG. 18 is a partial perspective view of the bicycle brake device illustrated in FIG. 1.

As seen in FIGS. 14 and 18, the base member 18 is configured to guide the second link member 98 to maintain an orientation of the friction surface 19 of the friction member 16 between the rest position P21 and the braking position P22. The base member 18 includes a guide surface 124. The link structure 32 includes a guide member 126 mounted on the second link member 98. The guide member 126 is rotatably mounted on the second link member 98. In the illustrated embodiment, the second link member 98 includes a support rod 128. The guide member 126 is rotatably mounted on the support rod 128 about a guide rotational axis A32. The guide member 126 is in contact with the guide surface 124 to maintain an orientation of the friction surface 19 of the friction member 16 between the rest position P21 and the braking position P22.

Figure 19:
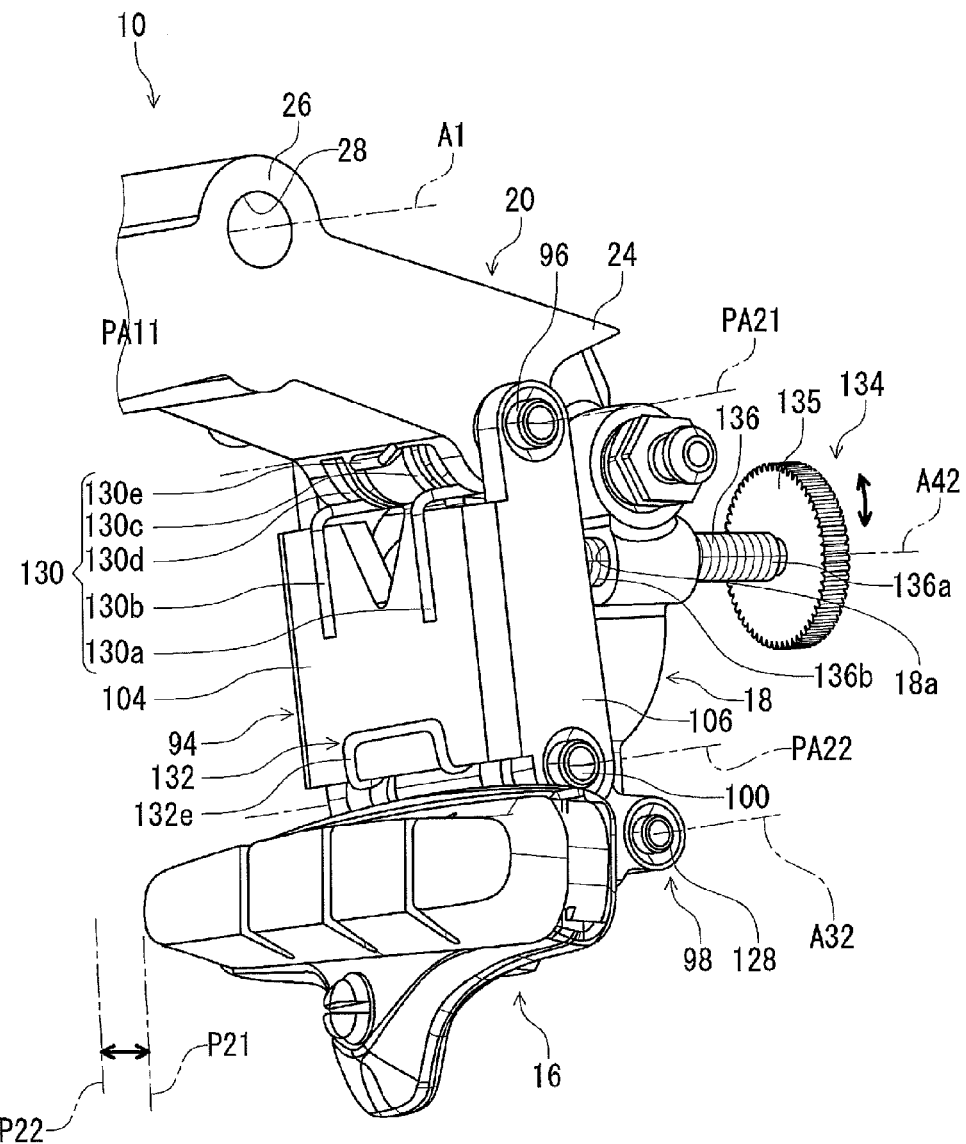
FIG. 19 is a partial perspective view of the bicycle brake device illustrated in FIG. 1.

As seen in FIG. 19, the bicycle brake device 10 further comprises a first biasing member 130 configured to bias the first link member 94 relative to the base member 18 toward the piston 42. In the illustrated embodiment, the first biasing member 130 is a torsion spring and is mounted to the first link pin 96. The first biasing member 130 includes a first end 130a, a second end 130b, a first coiled body 130c, a second coiled body 130d, and a first intermediate portion 130e. The first end 130a extends from the first coiled body 130c. The second end 130b extends from the second coiled body 130d. The first intermediate portion 130e is provided between the first coiled body 130c and the second coiled body 130d and couples the first coiled body 130c to the second coiled body 130d. The first link pin 96 extends through the first coiled body 130c and the second coiled body 130d. The first end 130a and the second end 130b are engaged with the receiving portion 104 of the first link member 94. The first intermediate portion 130e are engaged with the coupling member 20.

As seen in FIGS. 16, 17, and 19, the bicycle brake device 10 further comprises a second biasing member 132 configured to bias the second link member 98 relative to the first link member 94 toward the base member 18. In the illustrated embodiment, the second biasing member 132 is a torsion spring and is mounted to the second link pin 100. The second biasing member 132 includes a third end 132a, a fourth end 132b, a third coiled body 132c, a fourth coiled body 132d, and a second intermediate portion 132e (FIG. 19). The third end 132a extends from the third coiled body 132c. The fourth end 132b extends from the fourth coiled body 132d. The second link pin 100 extends through the third coiled body 132c and the fourth coiled body 132d. The third end 132a and the fourth end 132b are engaged with the support rod 128 of the second link member 98.

As seen in FIG. 19, the second intermediate portion 132e is provided between the third coiled body 132c and the fourth coiled body 132d and couples the third coiled body 132c and the fourth coiled body 132d. The second intermediate portion 132e are engaged with the receiving portion 104 of the first link member 94.

As seen in FIG. 18, the bicycle brake device 10 further comprises a clearance adjustment member 134 configured to adjust the rest position P21 of the friction member 16 relative to the hydraulic cylinder 40. The clearance adjustment member 134 includes an operating portion 135 configured to be operated by the user to adjust the rest position P21 of the friction member 16. In the illustrated embodiment, the operating portion 135 has a disk shape such that the operating portion 135 can be operated without any tools. In other words, the adjustment member 134 is configured as a tool-less adjustment member.

As seen in FIGS. 18 and 19, the clearance adjustment member 134 includes an adjustment rod 136 rotatably mounted to the base member 18 about an adjustment rotational axis A42. The adjustment rod 136 includes a first rod end 136a and a second rod end 136b opposite to the first rod end 136a along the adjustment rotational axis A42. The operating portion 135 is provided at the first rod end 136a. The second rod end 136b is in contact with the first link member 94. In the illustrated embodiment, the second rod end 136b is in contact with the first frame portion 106 of the first link member 94.

As seen in FIG. 19, the adjustment rod 136 includes an external thread. The base member 18 includes a threaded hole 18a. The adjustment rod 136 is threadedly engaged with the threaded hole 18a via the external thread. Rotation of the clearance adjustment member 134 relative to the base member 18 moves the clearance adjustment member 134 relative to the base member 18 along the adjustment rotational axis A42, changing a position of the first link member 94 relative the base member 18. This can change the rest position P21 of the friction member 16. The first biasing member 130 is configured to push the first link member 94 against the second rod end 136b of the adjustment rod 136.

As seen in FIG. 12, the operating portion 135 is at least partially provided in the frame area 92 when viewed from the movement direction D22 in the attachment state. In the illustrated embodiment, the operating portion 135 is partially provided in the frame area 92 when viewed from the movement direction D22 in the attachment state. However, the operating portion 135 can be entirely provided in the frame area 92 when viewed from the movement direction D22 in the attachment state.

The adjustment rod 136 is at least partially provided in the frame area 92 when viewed from the movement direction D22 in the attachment state. In the illustrated embodiment, the adjustment rod 136 is entirely provided in the frame area 92 when viewed from the movement direction D22 in the attachment state. However, the adjustment rod 136 can be partially provided in the frame area 92 or entirely provided outside the frame area 92 when viewed from the movement direction D22 in the attachment state. While the adjustment rotational axis A42 is provided in the frame area 92 when viewed from the movement direction D22 in the attachment state, the adjustment rotational axis A42 can be provided outside the frame area 92 when viewed from the movement direction D22 in the attachment state.

As seen in FIG. 16, the operating portion 135 is at least partially provided in the link area 112 when viewed from the movement direction D22 in the attachment state. In the illustrated embodiment, the operating portion 135 is partially provided in the link area 112 when viewed from the movement direction D22 in the attachment state. However, the operating portion 135 can be entirely provided in the link area 112 when viewed from the movement direction D22 in the attachment state.

The adjustment rod 136 is at least partially provided in the link area 112 when viewed from the movement direction D22 in the attachment state. In the illustrated embodiment, the adjustment rod 136 is entirely provided in the link area 112 when viewed from the movement direction D22 in the attachment state. However, the adjustment rod 136 can be partially provided in the link area 112 or entirely provided outside the link area 112 when viewed from the movement direction D22 in the attachment state. While the adjustment rotational axis A42 is provided in the link area 112 when viewed from the movement direction D22 in the attachment state, the adjustment rotational axis A42 can be provided outside the link area 112 when viewed from the movement direction D22 in the attachment state.

Figure 20:
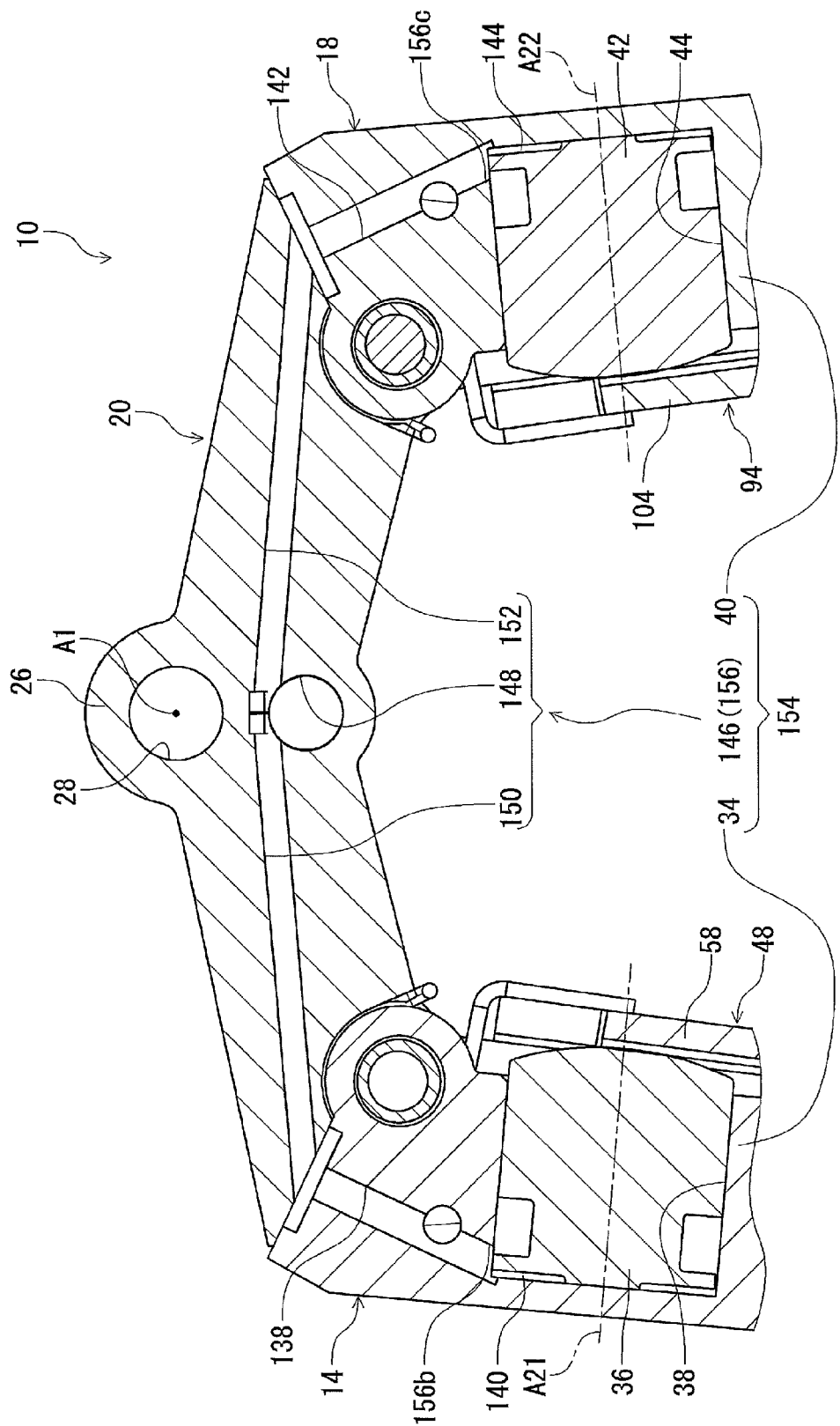
FIG. 20 is a partial cross-sectional view of the bicycle brake device illustrated in FIG. 1.

As seen in FIG. 20, the hydraulic cylinder 34 includes a fluid passageway 138 connected to a hydraulic chamber 140 defined by the hydraulic cylinder 34 and the piston 36. The additional hydraulic cylinder 40 includes an additional fluid passageway 142 connected to an additional hydraulic chamber 144 defined by the additional hydraulic cylinder 40 and the additional piston 42. The coupling member 20 includes an intermediate fluid passageway 146 configured to connect the fluid passageway 138 to the additional fluid passageway 142.

In the illustrated embodiment, the intermediate fluid passageway 146 includes an inlet passageway 148, a first connecting passageway 150, and a second connecting passageway 152. The first connecting passageway 150 connects the inlet passageway 148 to the fluid passageway 138 of the base member 14. The second connecting passageway 152 connects the inlet passageway 148 to the additional fluid passageway 142 of the base member 18.

Figure 21:
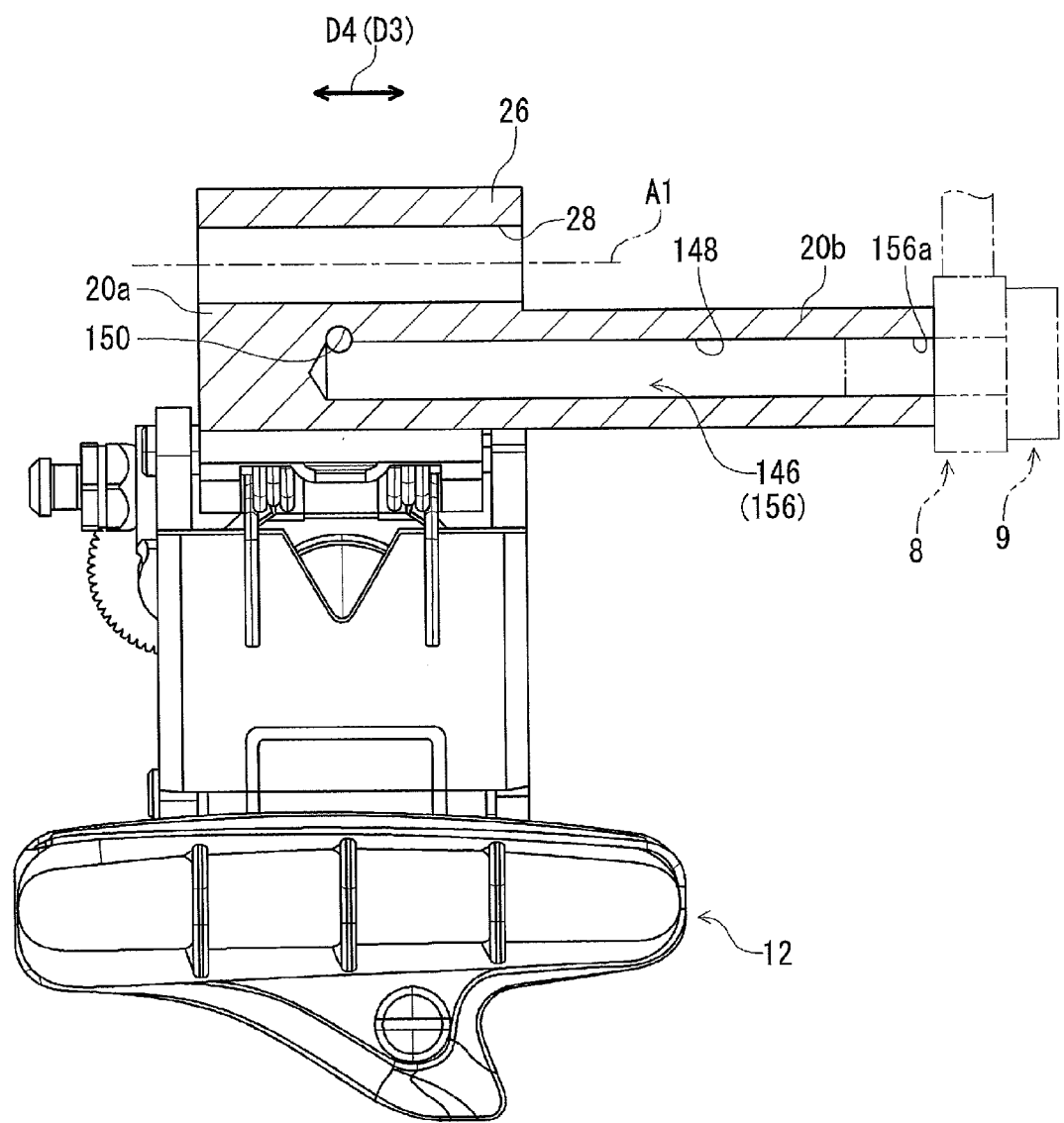
FIG. 21 is a cross-sectional view of the bicycle brake device illustrated in FIG. 1.

As seen in FIG. 21, the intermediate fluid passageway 146 at least partially extends in a mounting direction D4 parallel to the mounting axis A1. In the illustrated embodiment, the inlet passageway 148 extends in the mounting direction D4. As seen in FIG. 11, the mounting axis A1 is parallel to the first pivot axis PA11 and the second pivot axis PA12. As seen in FIG. 19, the mounting axis A1 is parallel to the first pivot axis PA21 and the second pivot axis PA22. The coupling member 20 includes a main body 20a and a connecting pipe 20b extending from the main body 20a in the mounting direction D4. The inlet passageway 148 is partially provided in the connecting pipe 20b.

In other words, as seen in FIG. 20, the bicycle rim brake device 10 comprises a base structure 154. The base structure 154 includes the hydraulic cylinder 34, the additional hydraulic cylinder 40, and an internal fluid passageway 156. As seen in FIGS. 20 and 21, the internal fluid passageway 156 includes a single inlet port 156a, an outlet port 156b, and an additional outlet port 156c. The outlet port 156b is connected to the hydraulic cylinder 34. The additional outlet port 156c is connected to the additional hydraulic cylinder 40. A banjo 8 is connected to the inlet port 156a via a banjo attachment bolt 9.

As seen in FIGS. 20 and 21, when a brake operating device (not shown) is operated by a user, hydraulic pressure is transmitted from a master cylinder (not shown) of the brake operating device to the hydraulic chamber 140 and the additional hydraulic chamber 144 via the intermediate fluid passageway 146 of the coupling member 20.

As seen in FIG. 6, the hydraulic pressure moves the piston 36 relative to the base member 14 toward the receiving portion 58 of the link structure 30 in the movement direction D21 against the biasing force of the first biasing member 84. This moves the piston 36 relative to the base member 14 from the rest position P11 toward the braking position P12.

Similarly, as seen in FIG. 14, the hydraulic pressure moves the piston 42 relative to the base member 18 toward the receiving portion 104 of the link structure 32 in the movement direction D22 against the biasing force of the first biasing member 130. This moves the piston 42 relative to the base member 18 from the rest position P21 toward the braking position P22. Thus, the bicycle rim 5 is sandwiched between the friction members 12 and 16, applying the braking force from each of the friction members 12 and 16 to the bicycle rim 5 of the bicycle wheel 4.

Since the guide member 80 is guided along the guide surface 78 of the base member 14, the orientation of the friction member 12 is maintained while the friction member 12 moves from the rest position P11 toward the braking position P12. Similarly, since the guide member 126 is guided along the guide surface 124 of the base member 18, the orientation of the friction member 16 is maintained while the friction member 16 moves from the rest position P21 toward the braking position P22.

With the bicycle brake device 10, as seen in FIG. 6, the link structure 30 is configured to couple the friction member 12 to the base member 14 so as to move the friction member 12 relative to the base member 14 between the rest position P11 and the braking position P12. The piston 36 is configured to push the link structure 30 to move the friction member 12 from the rest position P11 toward the braking position P12. For example, this can make a stroke of the piston 36 shorter than a travel of the friction member 12, allowing the bicycle brake device 10 to be more compact.

Similarly, as seen in FIG. 14, the link structure 32 is configured to couple the friction member 16 to the base member 18 so as to move the friction member 16 relative to the base member 18 between the rest position P21 and the braking position P22. The piston 42 is configured to push the link structure 32 to move the friction member 16 from the rest position P21 toward the braking position P22. For example, this can make a stroke of the piston 42 shorter than a travel of the friction member 16, allowing the bicycle brake device 10 to be more compact.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle brake device comprising:
a friction member including a friction surface;
a base member including a hydraulic cylinder;
a link structure configured to couple the friction member to the base member so as to move the friction member relative to the base member between a rest position and a braking position, the link structure including
a first link member pivotably coupled to the base member about a first pivot axis, and
a second link member pivotably coupled to the first link member about a second pivot axis parallel to the first pivot axis, the friction member being attached to the second link member; and
a piston movable in the hydraulic cylinder in a movement direction and configured to push the link structure to move the friction member from the rest position toward the braking position, the friction member including a curved surface configured to change a direction in which the friction surface faces relative to the second link member in a rest state where the friction member is positioned at the rest position relative to the base member, wherein
the piston is provided between the first pivot axis and the friction member.

2. The bicycle brake device according to claim 1, wherein the piston is configured to push the first link member to move the friction member from the rest position toward the braking position.

3. The bicycle brake device according to claim 1, wherein the piston is at least partially provided in a link area defined by an outline of the first link member when viewed from the movement direction.

4. The bicycle brake device according to claim 3, wherein the piston has a center axis parallel to the movement direction, and
the center axis is provided in the link area when viewed from the movement direction.

5. The bicycle brake device according to claim 2, wherein the first link member includes a receiving portion contactable with the piston, and
the piston is configured to push the receiving portion of the first link member.

6. The bicycle brake device according to claim 5, wherein
the first link member includes a first frame portion pivotably coupled to the base member about the first pivot axis, and
the receiving portion is secured to the first frame portion.

7. The bicycle brake device according to claim 6, wherein
the first link member includes a second frame portion pivotably coupled to the base member about the first pivot axis, and
the receiving portion is secured to the second frame portion.

8. The bicycle brake device according to claim 7, wherein
the first frame portion is spaced apart from the second frame portion in an axial direction parallel to the first pivot axis, and
the receiving portion is provided between the first frame portion and the second frame portion in the axial direction and couples the first frame portion to the second frame portion.

9. The bicycle brake device according to claim 1, further comprising:
a first biasing member configured to bias the first link member relative to the base member toward the piston.

10. The bicycle brake device according to claim 1, wherein
the base member is configured to guide the second link member to maintain the direction in which the friction surface faces when the friction member moves between the rest position and the braking position.

11. The bicycle brake device according to claim 1, further comprising:
a second biasing member configured to bias the second link member relative to the first link member toward the base member.

12. The bicycle brake device according to claim 2, wherein
the piston is coupled to the first link member without being fixed to the first link member.

13. The bicycle brake device according to claim 1, further comprising:
an additional friction member;
an additional base member including an additional hydraulic cylinder;
an additional link structure configured to couple the additional friction member to the additional base member so as to move the additional friction member relative to the additional base member between an additional rest position and an additional braking position;
an additional piston movable in the additional hydraulic cylinder in an additional movement direction and configured to push the additional link structure to move the additional friction member from the additional rest position toward the additional braking position; and
a coupling member configured to couple the base member to the additional base member.

14. The bicycle brake device according to claim 13, wherein
the hydraulic cylinder includes a fluid passageway connected to a hydraulic chamber defined by the hydraulic cylinder and the piston,
the additional hydraulic cylinder includes an additional fluid passageway connected to an additional hydraulic chamber defined by the additional hydraulic cylinder and the additional piston, and
the coupling member includes an intermediate fluid passageway configured to connect the fluid passageway to the additional fluid passageway.

15. The bicycle brake device according to claim 14, wherein
the coupling member has a mounting structure configured to mount the coupling member to a bicycle frame.

16. The bicycle brake device according to claim 15, wherein
the mounting structure has a mounting opening extending along a mounting axis, and
the intermediate fluid passageway at least partially extends in a mounting direction parallel to the mounting axis.

17. The bicycle rim brake device according to claim 13, wherein
the link structure includes
a first additional link member pivotably coupled to the additional base member about a first additional pivot axis, and
a second additional link member pivotably coupled to the first additional link member about a second additional pivot axis parallel to the first additional pivot axis, the additional friction member being attached to the second additional link member,
the additional friction member includes an additional friction surface, and
the additional friction member includes an additional curved surface configured to change a direction in which the additional friction surface faces relative to the second additional link member in a rest state where the additional friction member is positioned at the additional rest position relative to the additional base member.

18. A bicycle brake device comprising:
a friction member;
a base member including a hydraulic cylinder;
a link structure configured to couple the friction member to the base member so as to move the friction member relative to the base member between a rest position and a braking position; and
a piston movable in the hydraulic cylinder in a movement direction and configured to push the link structure to move the friction member from the rest position toward the braking position,
the link structure including a first link member pivotably coupled to the base member about a first pivot axis,
the piston being configured to push the first link member to move the friction member from the rest position toward the braking position,
the link structure including a second link member pivotably coupled to the first link member about a second pivot axis parallel to the first pivot axis,
the friction member being attached to the second link member,
the friction member having a friction surface which faces a rotatable member,
the base member including a guide surface,
the link structure including a guide member mounted on the second link member, and
the guide member being in contact with the guide surface to maintain an orientation of the friction surface of the friction member between the rest position and the braking position.

19. The bicycle brake device according to claim 18, wherein the guide member is rotatably mounted on the second link member.

20. A bicycle brake device comprising:
a friction member including a friction surface;
a base member including a hydraulic cylinder;
a link structure configured to couple the friction member to the base member so as to move the friction member relative to the base member between a rest position and a braking position, the link structure including
   a first link member pivotably coupled to the base member about a first pivot axis and
   a second link member pivotably coupled to the first link member about a second pivot axis parallel to the first pivot axis, the friction member being attached to the second link member; and
a piston movable in the hydraulic cylinder in a movement direction and configured to push the link structure to move the friction member from the rest position toward the braking position, the friction member including a curved surface configured to change a direction in which the friction surface faces relative to the second link member in a rest state where the friction member is positioned at the rest position relative to the base member, wherein
the piston is provided between the first pivot axis and the second pivot axis.

* * * * *